(12) United States Patent
Selvam et al.

(10) Patent No.: US 11,514,496 B2
(45) Date of Patent: Nov. 29, 2022

(54) SUMMARIZATION AND PERSONALIZATION OF BIG DATA METHOD AND APPARATUS

(71) Applicant: Avalara, Inc., Seattle, WA (US)

(72) Inventors: Praveen Selvam, Chennai (IN); Sanjay Parthasarathy, Bellevue, WA (US); Satyanarayana Rao Kalikivayi, Chennai (IN)

(73) Assignee: AVALARA, INC., Seattle, WA (US)

(*) Notice: Subject to any disclaimer, the term of this patent is extended or adjusted under 35 U.S.C. 154(b) by 585 days.

(21) Appl. No.: 14/656,171

(22) Filed: Mar. 12, 2015

(65) Prior Publication Data

US 2015/0186972 A1    Jul. 2, 2015

Related U.S. Application Data

(63) Continuation-in-part of application No. 13/951,248, filed on Jul. 25, 2013, now abandoned, and a continuation-in-part of application No. 13/951,244, filed on Jul. 25, 2013, now Pat. No. 9,047,614.

(60) Provisional application No. 61/952,004, filed on Mar. 12, 2014, provisional application No. 61/952,029, filed on Mar. 12, 2014.

(51) Int. Cl.
| | |
|---|---|
| *G06Q 30/06* | (2012.01) |
| *G06Q 30/02* | (2012.01) |
| *G06Q 10/08* | (2012.01) |

(52) U.S. Cl.
CPC ....... *G06Q 30/0623* (2013.01); *G06Q 10/087* (2013.01); *G06Q 30/0201* (2013.01); *G06Q 30/0202* (2013.01)

(58) Field of Classification Search
CPC ............ G06Q 30/0623; G06Q 10/087; G06Q 30/0201; G06Q 30/0202
See application file for complete search history.

(56) References Cited

U.S. PATENT DOCUMENTS

| | | | | |
|---|---|---|---|---|
| 5,583,763 A | * | 12/1996 | Atcheson | .......... G06F 17/30017 707/750 |
| 6,658,467 B1 | * | 12/2003 | Rice | ........................ G06Q 30/02 709/219 |
| 7,107,226 B1 | * | 9/2006 | Cassidy | ............. G06Q 30/0625 705/26.62 |
| 7,130,807 B1 | * | 10/2006 | Mikurak | ................. G06Q 10/06 705/7.25 |

(Continued)

*Primary Examiner* — Kris E Mackes
*Assistant Examiner* — Lin Lin M Htay
(74) *Attorney, Agent, or Firm* — Jeremiah J. Baunach; VLP Law Group LLP

(57) ABSTRACT

One or more non-transitory computer-readable storage media are presented. In embodiments, the one or media may comprise a plurality of instructions that in response to being executed cause a computer to: receive, via a user interface, a user selection including a product, and a brand, vendor and category associated with the product; access a set of product information that includes information regarding the selected product, the set of product information including a set of products, and for each product in the set: a price, one or more brands under which the product is sold, a set of vendors offering it for sale, a categorization schema and a set of analysis results; and display to the user, via the user interface, a first analysis result from the set of analysis results for the selected product.

17 Claims, 16 Drawing Sheets

(56) References Cited

U.S. PATENT DOCUMENTS

| | | | |
|---|---|---|---|
| 7,243,082 B1* | 7/2007 | Forlai | G06Q 20/042 705/35 |
| 7,447,646 B1* | 11/2008 | Agarwal | G06Q 20/201 705/26.3 |
| 7,783,536 B2 | 8/2010 | William et al. | |
| 7,933,803 B1 | 4/2011 | Nadler et al. | |
| 7,996,282 B1* | 8/2011 | Scott | G06Q 30/06 705/27.1 |
| 8,050,974 B2* | 11/2011 | Lopez | G06Q 30/06 705/26.1 |
| 8,108,271 B1* | 1/2012 | Duncan | 705/28 |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 2001/0014868 A1* | 8/2001 | Herz | G06Q 10/0637 705/14.38 |
| 2002/0032597 A1* | 3/2002 | Chanos | G06Q 30/02 705/26.64 |
| 2005/0160014 A1* | 7/2005 | Moss | G06Q 30/00 705/26.61 |
| 2005/0189414 A1* | 9/2005 | Fano | G06Q 30/0255 235/383 |
| 2006/0069585 A1* | 3/2006 | Springfield | G06Q 30/02 705/7.29 |
| 2007/0136158 A1 | 6/2007 | Rawlings et al. | |
| 2007/0136159 A1 | 6/2007 | Rawlings et al. | |
| 2009/0018996 A1* | 1/2009 | Hunt | G06Q 30/02 |
| 2009/0216571 A1* | 8/2009 | Sunshine | G06Q 30/0601 705/5 |
| 2010/0191619 A1* | 7/2010 | Dicker | G06Q 30/02 705/26.1 |
| 2010/0262495 A1* | 10/2010 | Dumon | G06Q 30/02 705/14.54 |
| 2012/0232952 A1* | 9/2012 | Leonard | G06Q 10/00 705/7.31 |
| 2012/0303411 A1* | 11/2012 | Chen | G06Q 10/087 705/7.31 |
| 2013/0014136 A1* | 1/2013 | Bhatia | H04N 21/4222 725/9 |
| 2015/0287060 A1* | 10/2015 | Parthasarathy | G06F 16/951 705/7.31 |

\* cited by examiner

SUMMARIZATION AND PERSONALIZATION OF BIG DATA METHOD AND APPARATUS

CROSS-REFERENCE TO RELATED APPLICATIONS

This application claims the benefit of U.S. Provisional Patent Application Ser. No. 61,952,004, filed on Mar. 12, 2014, and U.S. Provisional Patent Application Ser. No. 61,952,029, filed on Mar. 12, 2014, and is a continuation-in-part of U.S. application Ser. No. 13/951,248, filed Jul. 25, 2013, PCT Application Number PCT/US13/52108, filed Jul. 25, 2013, U.S. application Ser. No. 13/951,244, filed Jul. 25, 2013, and PCT Application Number PCT/US13/52106, filed Jul. 25, 2013, which applications claim the benefit of U.S. Provisional Application Ser. No. 61/675,492, filed on Jul. 25, 2012. All of the foregoing applications and child applications thereof are incorporated herein, in their entirety, for all purposes.

FIELD

This disclosure is directed to the field of software, and more particularly, to a user interface for a computer, which user interface summarizes and personalizes a very large set of data relating to price and product information.

BACKGROUND

Indix Corporation collects and analyses a large amount of longitudinal data regarding products, product attributes, prices, and price attributes. To be understood by a person, this large amount of data and analytic output derived therefrom must be summarized, personalized, and organized in relevant terms. The summarization and personalization of such a large and complex set of data presents challenges in the selection and refinement of information as well as with respect to identification of patterns and arrangement of information in a user interface.

DESCRIPTION

Figure 1:
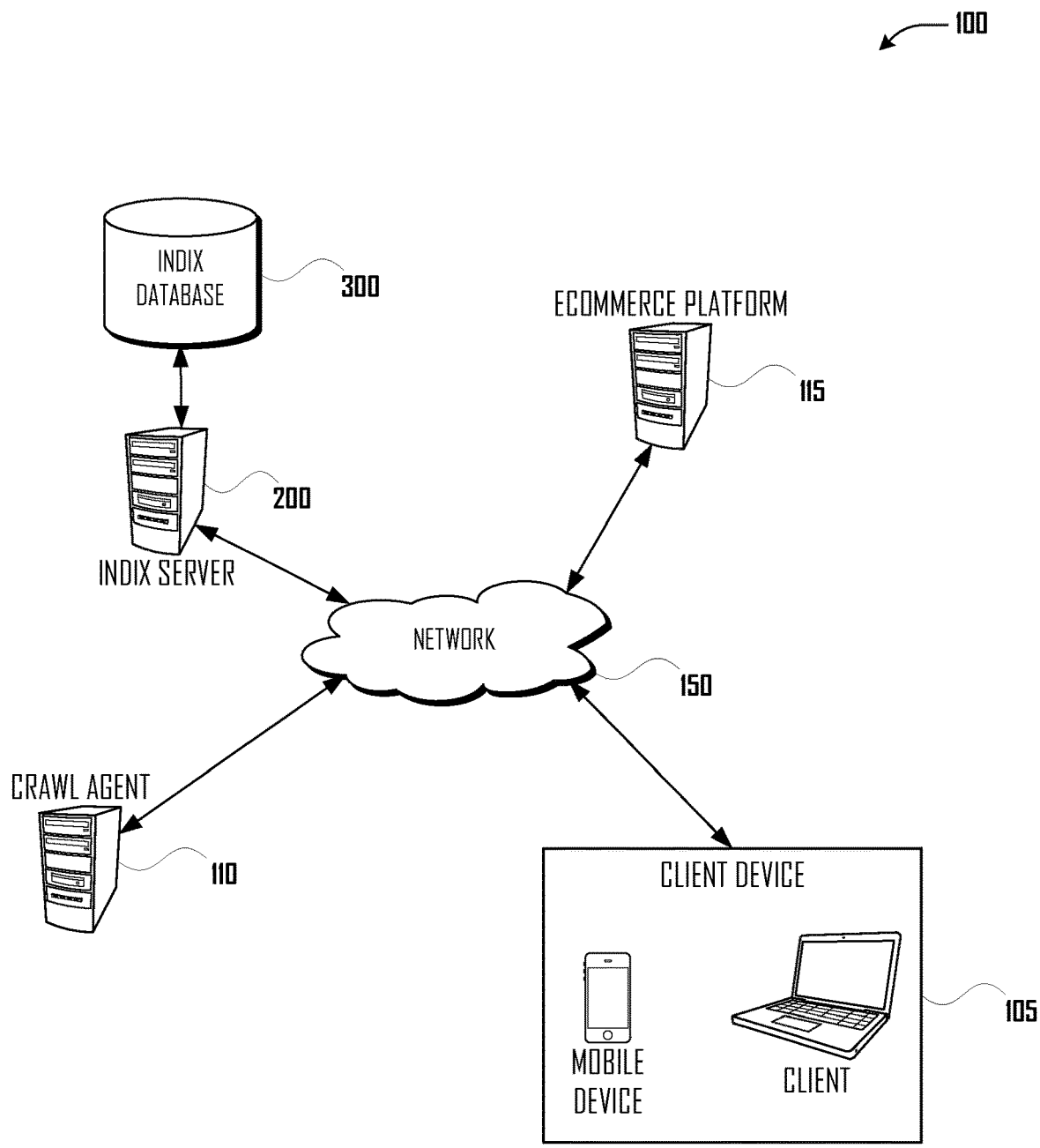
FIG. 1 illustrates a computing environment configured according to an embodiment.

As described further herein, UI Routine 400 allows users to pick a Brand or Merchant (referred to as "User Home 305"), one or more competitors thereof (referred to as "Competitor 310"), and to create lists of products and categories of products (referred to as "User Lists 320"). UI Routine 400 selectively displays information regarding and comparisons among User Home 305, Competitor 310, User Lists and other user selections in relation to Products 327, Categories 335 of Products 327, Brands, and Merchants. The information regarding these items may be obtained from "Insights." Briefly (a longer description is provided herein), Insights are analytic processes which identify, for example, price changes, and what product and price attributes across the datasets are associated with changes in price. Selections and arrangements of information may be saved to a personalized dashboard.

Throughout UI Routine 400, colors are used in relation to various information items, to aid the user in quickly ascertaining, by color, what information is being displayed. For example (in other embodiments, different colors or other approaches to distinguishing items may be used), Brands are orange, Merchants are green, categories are yellow, quickviews are red, smart lists are violet, custom lists are blue, and alerts are black.

In various embodiments, UI Routine 400 performs one or more of the following processes: Create User Home Items 500, Create List Process 600, Alert Process 700, Report Process 800, Summary Process 900, Quick View Process 1000, Show Products Process 1100, Show Promotions Process 1200, Show Social Process 1300, Show Analysis Process 1400, and Recommendation Process 1500.

In an embodiment of Create User Home Items 500, User Home Items are created. User Home Items may comprise a selection of a Brand or Merchant (referred to as "User Home 305") as well as a selection of a competitor of the User Home 305 (referred to as "Competitor 310"). Generally, a "Brand" may be understood as a trademark under which products or services are sold; products and services are referred to herein as Product(s) 327. Products 327 are unique products or services made by a manufacturer or provided by a service provider, each separate Product 327 generally being sold under a SKU number, Universal Product Code ("UPC"), product or service name, or the like. Indix Corporation has crawlers, such as Crawl Agent 110, and data analysis methods and systems which identify Products 327, Price Attributes 340, and Product Attributes 345 (discussed at greater length in U.S. application Ser. Nos. 13/951,248 and 13/951,244). In the claims, Price Attributes 340 and Product Attribute 345 are both referred to as "product information". User Home Items are used in other of the processes discussed herein to present information to the user, generally, though not exclusively, relating to the User Home 305 and/or the Competitor 310.

In addition to creating User Home Items, Create User Home Items 500 also allows a user to identify Products 327 as Linked Products 315. When two Products 327 are identified as Linked Products 315, a search engine routine executed by the Indix Server 200 may increase the frequency with which the Crawl Agent 110 access websites which contain information regarding the Linked Products 315. Other processes executed by the Indix Server 200, such as "Substitution Routine 800" described in U.S. application Ser. No. 13/951,248, may identify the Linked Products 315 as "Substitutes", which, generally, indicates two Products 327 have similar Product Attributes 345 and may be substituted, one for the other.

In an embodiment of Create List Process 600, User List(s) 320 may be created. User List(s) 320 may comprise Custom Lists and Smart Lists. User List(s) 320 may comprise a User Home 305, a Category 335, a Product 315 and/or a list of Products 315 (not necessarily part of the User Home 305) which are selected by the user and/or uploaded to the Create List Process 600.

In an embodiment of Alert Process 700, Alert(s) 355 may be created relative to User Home Items and/or User List(s) 320. The Alert(s) 355 may be triggered, for example, when the relative or absolute price of a Product 327, a Category 335 of Products 327, Products 327 at a Merchant or the like changes or passes a threshold.

In an embodiment of Report Process 800, Report(s) 350 may be created relative to User Home Items and/or User List 320 (User List 320 is described further herein). Report(s) 350 (discussed further herein) may be setup to trigger actions, such as to re-price or order more of a Product 327.

In an embodiment of Summary Process 900, Insight Information 330 may be provided relative to User Home Items and/or User List 320. "Insight Information 330" is the output of analytic processes ("Insights 375" determined by "Insights Routine 600" as described in U.S. patent application Ser. No. 13/951,248) which analytic processes identify, for example, price changes, and what Product Attributes 345 and Price Attributes 340 across the datasets are associated with changes in price. Insight Information 330 may comprise the output of analysis directed to determining at least, for example, the following: i) the volatility of prices relative to Attributes 345, Price Attributes 340, and other data available to the Indix Server 200; ii) Substitutes for Products 327 and Categories 335 of Products 327; iii) the number of Products 327, Brands, and Categories 335 of Products 327 in the many datasets available to the Indix Server 200; iv) predicting the future price of Products 327; v) competitors relative to a Merchant, Store or Brand, vi) promotions of Products, Stores, or Brands; vii) which Products lead or follow others in terms of price changes; viii) which Products in a Category 335 charge higher (premium) prices; ix) the number of price ranges and maximum and minimum for Products and Categories 335 of products; and x) the reach of Products 327 in terms of the number of people who visit a physical or online sales venue. In the claims, Insight Information 330 are part of a group which are referred to as the result of analysis of the set of product information.

In an embodiment of Quick View Process 1000, Insight Information 330 may be provided relative to User List 320, in color coded tiles and with recommendations generated by Recommendation Process 1500. Quick View Process 1000 may also provide information refining functions to a user.

In an embodiment of Show Products Process 1100, information regarding Product(s) 327 may be provided to a user with functions to refine the set of Product(s).

In an embodiment of Show Promotions Process 1200, promotion information relative to Products 327 may be provided to a user.

In an embodiment of Show Social Process 1300, information regarding social network events relative to User Home Item(s) and/or User List(s) 320 may be provided to a user.

In an embodiment of Show Analysis Process 1400, Insight Information 330 may be obtained, patterns therein may be identified, a scale may be selected to fit the observed patterns, the Insight Information 330 may be output in graphical or textual form, user criteria to refine the output may be received and implemented, and the output may be assigned to a Dashboard.

In an embodiment of Recommendation Process 1500, two or more Products provided by different Merchants or at different Stores may be compared and, based on the comparison, recommendations may be made to add or remove Products from inventory, to increase or decrease prices, or to increase or decrease Promotions of a Product.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a computing environment 100 configured according to an embodiment. Generally, Indix Server 200 connects to Indix Database 300 and Network 150. Also connected to Network 150 are Client Device 105, Crawl Agent 110, and Ecommerce Platform 115. Connection to Network 150 or direct connection between computing devices may require that the computers execute software routines which enable, for example, the seven layers of the Open System Interconnection (OSI) model of computer networking or equivalent in a wireless phone or wireless data network. Network 150 comprises computers, network connections among the computers, and software routines to enable communication between the computers over the network connections. Network 150 may comprise, for example, an Ethernet network and/or the Internet. Communication among the various computers and routines may utilize various data transmission standards and protocols such as, for example, the application protocol HTTP. Transmitted data may encode documents, files, and data in various formats such as, for example, HTML, XML, flat files, and JSON. Connection between Indix Server 200 and Indix Database 300 may be via Network 150.

Figure 2:
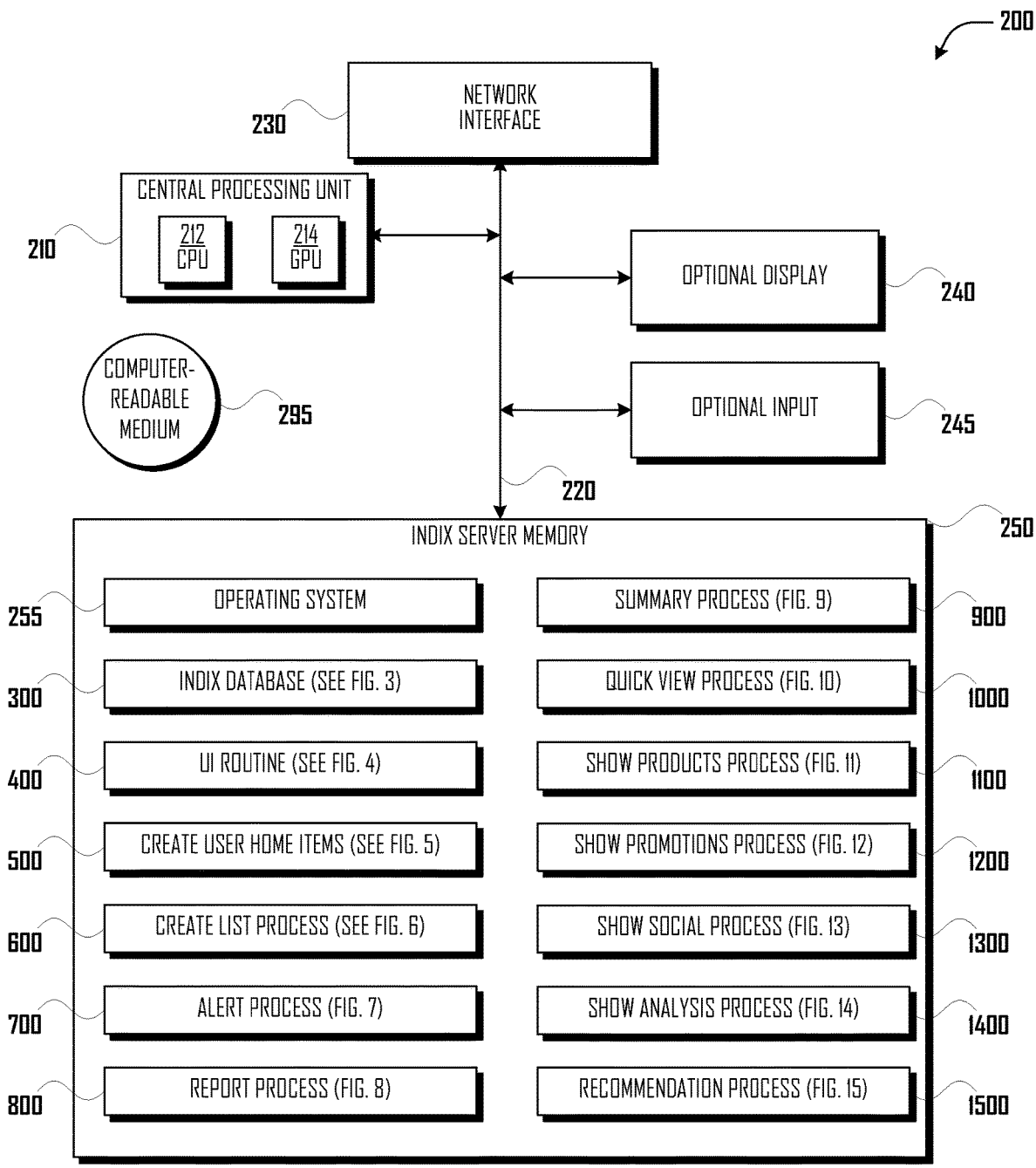
FIG. 2 illustrates an embodiment of Indix Server.

FIG. 2 illustrates several components of an exemplary Indix Server 200 in accordance with one embodiment. In various embodiments, Indix Server 200 may include a desktop PC, server, workstation, mobile phone, laptop, tablet, set-top box, appliance, or other computing device that is capable of performing operations such as those described herein. In some embodiments, Indix Server 200 may include many more components than those shown in FIG. 2. However, it is not necessary that all of these components be shown in order to disclose an illustrative embodiment.

In various embodiments, Indix Server 200 may comprise one or more physical and/or logical devices that collectively provide the functionalities described herein. In some embodiments, Indix Server 200 may comprise one or more replicated and/or distributed physical or logical devices and/or components.

In some embodiments, Indix Server 200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash. and the like.

Indix Server 200 includes bus 220 interconnecting several components including network interface 230, optional display 240, optional input 245, central processing unit 210, and memory 250.

Memory 250 generally comprises a random access memory ("RAM") and permanent non-transitory mass storage device, such as a hard disk drive or solid-state drive. Memory 250 stores program code for the following processes: UI Routine 400 for managing the other processes discussed herein; Create User Home Items 500; Create List Process 600; Alert Process 700; Report Process 800; Summary Process 900; Quick View Process 1000; Show Products Process 1100; Show Promotions Process 1200; Show Social Process 1300; Show Analysis Process 1400, and Recommendation Process 1500. In addition, memory 250 also stores operating system 255.

These and other software components may be loaded into memory 250 using a drive mechanism (not shown) associated with a non-transitory computer-readable medium 295, such as a floppy disc, tape, DVD/CD-ROM drive, memory card, or the like.

Figure 3:
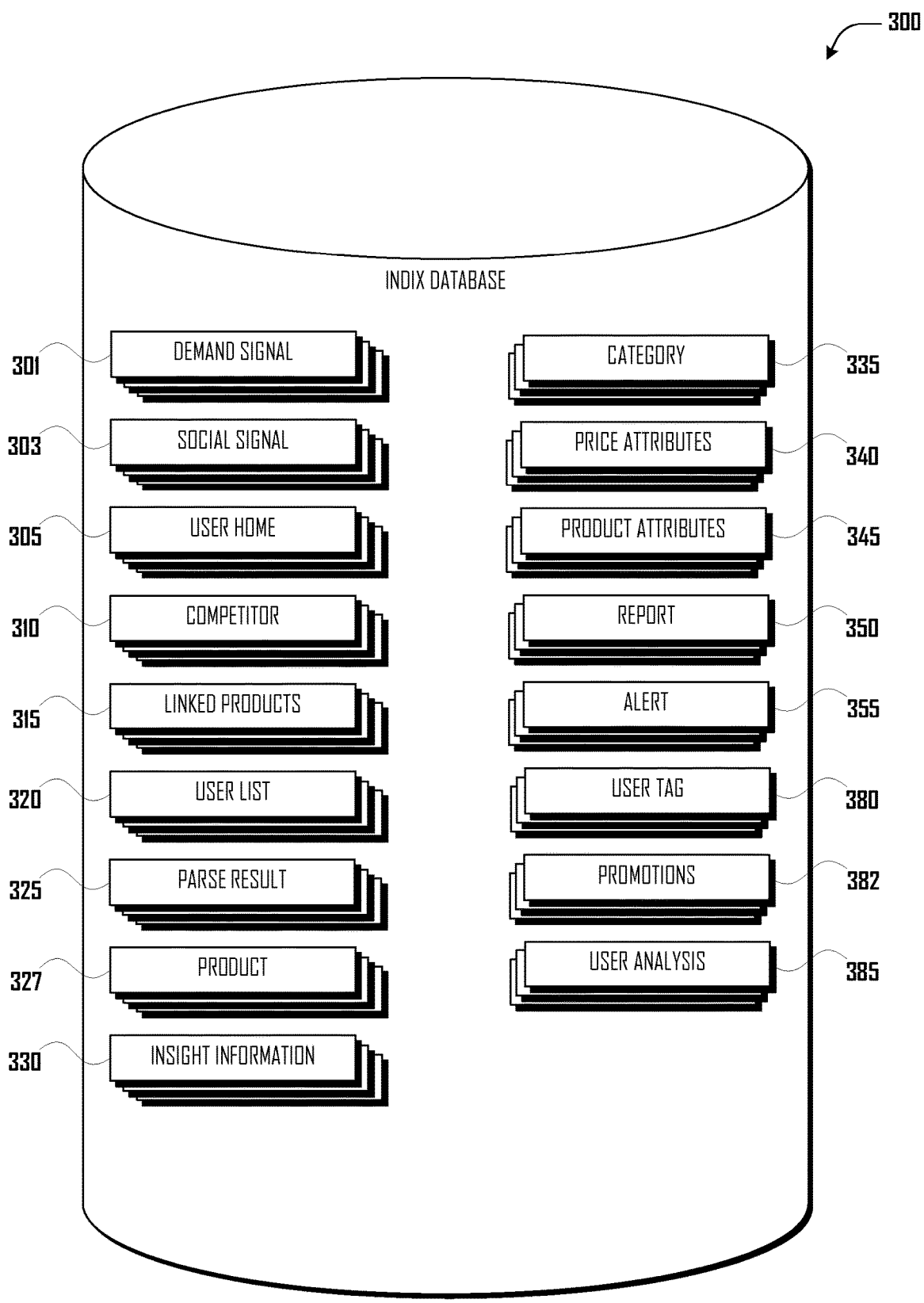
FIG. 3 illustrates an embodiment of Indix Server Database.

Memory 250 also includes Indix Database 300, illustrated further in FIG. 3. In some embodiments, Indix Server 200 may communicate with Indix Database 300 via network interface 230, a storage area network ("SAN"), a high-speed serial bus, and/or via the other suitable communication technology.

The browser routine referred to above may provide an interface for interacting with other computers through, for example, a webserver and a web browser routine (which may serve and request data and information in the form of webpages). The web browsers and webservers are meant to illustrate or refer to user- and machine-interface and user- and machine-interface enabling routines generally, and may be replaced by equivalent routines for obtaining information from, serving information to, and rendering information in a user or device interface. An application program interface (or "API") may be used to facilitate communication among computers and routines executed by computers. Login credentials and local instances of user or device profiles may be stored in or be accessible to Indix Server 200, Client Device 105, Ecommerce Platform 115, and Crawl Agent 110. Such user or device profiles may be utilized to provide secure communication between the computers.

Client Device 105, Crawl Agent 110 and Ecommerce Platform 115 may be provided by computing devices similar to Indix Server 200.

Indix Database 300, illustrated in FIG. 3, illustrates data groups used by routines. In addition to the data groups explicitly illustrated, additional data groups may also be present on and/or executed by this device, such as routines for databases, webservers, and web browsers, and routines to enable communication with other computers. The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The data groups used by routines and illustrated in FIG. 3 are discussed further herein in relation to the routines which utilize these data groups. A summary of these data groups is also provided, as follows:

Demand Signal 301 is a record recording demand signals for a Product. Demand Signal 301 is generally intended to comprise signals indicative of demand for a Product, such as whether demand for a Product is increasing or decreasing, whether demand is elastic or inelastic, and the like. Demand Signal 301 may be based on the availability and/or availability delta of a Product, the traffic to websites selling the Product, and the like. Demand Signal 301 may be determined as described in U.S. Provisional Patent Application Ser. No. 61/952,029 and child applications thereof in relation to "Demand Signal Determination Process 500". In the claims, Demand Signal 201 is part of the group which are referred to as the result of analysis of the set of product information.

Social Signal 303 is a record recording social media response to a Product, such as a number of "likes", "follows", positive and negative "tweets", "mentions", and the like, which number may be normalized relative to all Products or Products within a Category 335 in which the Product may be found.

User Home 305 is a record recording a Brand, Merchant, or Store selected by the user, selected according to an employer of the user, or in which the user is otherwise interested. User Home 305 may be created during execution of Create User Home Items 500 routine.

Competitor 310 is a record of one or more competitors of User Home 305 and may comprise a Brand, Merchant, or Store. Competitor 310 may be selected by a user or may be provided, optionally with confirmation, to the user. Who are competitors of User Home 305 may be determined by, for example, "Competition Routine 1100" described in application Ser. No. 13/951,248. In brief, with respect to Stores, Brands, and Merchants, Competitors 310 may be determined by identifying Stores, Brands, and Merchants which share a threshold level of the same Products 327, such as 70%.

Linked Products 315 is a record recording Products 327 which have been linked pursuant to Create User Home Items 500 routing. Linked Products 315 is described further in relation to FIG. 5.

User List 320 is a record recording the result of Create List Process 600. User List 320 is described further in relation to FIG. 6.

Parse Result 325 is a record recording content obtained from a URI by "Crawl Agent 400" as described in U.S. application Ser. No. 13/951,248 (corresponding to Crawl Agent 110). Generally, Parse Result 325 (described at greater length in U.S. application Ser. Nos. 13/951,248 and 13/951,244) may comprise a Product name, available in number of Stores, Product graphic, Store, price, promotion status, availability and the like. Information in Parse Result 325 records may be stored in, for example, Price Attribute 340 or Product Attribute 345 records.

Product 327 (or simply "Product") is a record recording a particular Product and may comprise a Product name, a product identifier (such as a UPC, SKU), and the like. In U.S. application Ser. Nos. 13/951,248 and 13/951,244, "MPID" or "MPID 332" is an identifier generally meant to identify a single Product, generally produced by a common manufacturer, though the Product may be distributed and sold by multiple parties. Product 327 as used herein is similar to "MPID" and MPIDs may be assigned as Products 327, though Product 327 may also include an identifier, such as a name, trademark, or the like. Product 327 may also be understood as a value within a Product Attribute 340 record, as discussed in application Ser. Nos. 13/951,248 and 13/951,244.

Insight Information 330 is a record recording the result of analytic processes ("Insights 375" determined by "Insights Routine 600" as described in U.S. patent application Ser. No. 13/951,248) which analytic processes identify, for example, price changes, and what Product Attributes 345 and Price Attributes 340 across the datasets are associated with changes in price. Insight Information 330 may comprise the output of analysis directed to determining at least the following: i) the volatility of prices relative to Attributes 345, Price Attributes 340, and other data available to the Indix Server 200; ii) Substitutes for Products 327 and Categories 335 of Products 327; iii) the number of Products 327, Brands, and Categories 335 of Products 327 in the many datasets available to the Indix Server 200; iv) predicting the future price of Products 327; v) competitors relative to Product, Store, or Brand, vi) promotions of Products, Stores, or Brands; vii) which Products lead or follow others in terms of price changes; viii) which Products in a Category 335 charge higher (premium) prices; ix) the number of price ranges and maximum and minimum for Products and Categories 335 of products; and x) the reach of Products 327 in terms of the number of people who visit a physical or online sales venue. In the claims, Insight Information 330 is part of the group which are referred to as the result of analysis of the set of product information.

Category 335 is defined further in U.S. application Ser. Nos. 13/951,248 and 13/951,244 and, generally, is an entry in a hierarchical categorization or taxonomy in which Products 327 are arranged. For example, a hierarchical categorization or taxonomy may take the following form: <clothing/shoes/dress shoes/high heels>. In this example, <high heels> may be recorded in a Category 335 record. The record may refer or be locatable in the location in the taxonomy represented by <clothing/shoes/dress shoes/high heels>.

Price Attributes 340 and Product Attribute 345 records may record information derived from Parse Result 325 records. Price Attribute 340 and Product Attribute 345 records are further defined in U.S. application Ser. Nos. 13/951,248 and 13/951,244. Generally, a Price Attribute 340 record may comprise one or more records recording, for example, a price observed at a particular time, a Product Name (a "Product Name" value in this record may also be referred to herein as "Product" and "Product 327"), a Product identifier (such as a SKU number), a Standard Price, a Sale, a Price, a Rebate amount, a Price Instructions record (containing special instructions relating to a price, such as that the price only applies to students), a Currency Type, a Date and Time Stamp, a Tax record, a Shipping record (indicating costs relating to shipping to different locations, whether tax is calculated on shipping costs, etc.), a Price Validity Start Date, a Price Validity End Date, a Quantity, a Unit of Measure Type, a Unit of Measure Value, a Merchant Name (with the name of a merchant from whom the Product is available; a "Merchant Name" value in this record may also be referred to herein as a "Merchant"), a Store Name (a Merchant may have multiple stores; a "Store Name" value in this record may also be referred to herein as a "Store"), a User ID, a Data Channel (indicating the source of Price Attribute 340 record, such as an online crawl, a crowd-source, a licensed supplier of price information, or from a merchant), a Source Details record (for example, indicating a URI, a newspaper advertisement), an Availability Flag, a Promotion Code, a Bundle Details record (indicating products which are part of a bundle), a Condition Type record (indicating new, used, poor, good, and similar), a Social Rank record (indicating a rank of "likes", "followers" and similar of the price), a Votes/Likes record (indicating a number of "likes", "follows" and similar which a Price or Product has received), a Price Rank record, a Visibility Indicator record (indicating whether the price is visible to the public, whether it is only visible to a Merchant, or the like), a Supply Chain Reference record (indicating whether the price was obtained from a retailer, a wholesaler, or another party in a supply chain), a Sale Location (indicating a geographic location where the product is available at the price), a Manufactured Location record (indicating where the product was produced or manufactured), a Launch Date record (indicating how long the product has been on the market), and an Age of Product record (indicating how long the product was used by the user). When capitalized herein, the foregoing terms (such as Product, Price, Merchant, Store, Source Details, etc.) are meant to refer to values in a Price Attribute 340 or Product Attribute 345 record.

A Product Attribute 345 record may comprise, for example, values encoding features of or describing a Product. The entire Product Attribute 345 schema may comprise thousands of columns, though only tens or hundreds of the columns may be applicable to any given Product. An example set of values in a Product Attribute 345 record for a ring is as follows: Title, "Sterling Silver Diamond & Blue Topaz Ring;" Brand, "Blue Nile;" Category (such as, for example, a Category 335 in a category schema), "rings;" Metal Name, "silver;" Stone Shape, "cushion;" Stone Name, "topaz;" Width, "3 mm;" Stone Color, "blue;" Product Type, "rings," Birthstone, "September;" and Setting Type, "prong." An example set of Product Attributes 345 for a shoe is as follows: Brand, "Asics;" Category (such as, for example, a Category 335 in a category schema or taxonomy), "Men's Sneakers & Athletic;" Shoe Size, "8;" Product Type, "wrestling shoes," Color, "black;" Shoe Style, "sneakers;" Sports, "athletic;" Upper Material, "mesh." When capitalized herein, the foregoing terms (such as Brand, Category, Metal Name, Product Type, etc.) are meant to refer to values in a Product Attribute 345 record.

Report 350 record may be produced during execution of Report Process 800. Report 350 record is discussed further in relation to FIG. 8.

Alert 355 record may be produced during execution of Alert Process 700. Alert 355 record is discussed further in relation to FIG. 7.

User Tag 380 record records an identifier assigned to a User List 320 by a user pursuant to Create List Process 600. User Tag 380 is discussed further in relation to FIG. 6.

Promotions 382 record records the number, length, date/time, and magnitude of promotions (discounts) of a Product, either as advertised or relative to an external criteria, such as an average or mean price. Information in Promotions 382 record may be obtained by, for example, "Promotion Routine 1200" described in U.S. patent application Ser. No. 13/951,248, and as discussed in U.S. Provisional Patent Application Ser. No. 61/952,029 and child application(s) thereof in relation to "Promotion 382" record therein. In the claims, Promotions 382 is part of the group which are referred to as the result of analysis of the set of product information.

User Analysis 385 record records a user-customized selection of Insight Information 330, pursuant to Show Analysis Process 1400. User Analysis 385 is discussed further in relation to FIG. 14.

Figure 4:
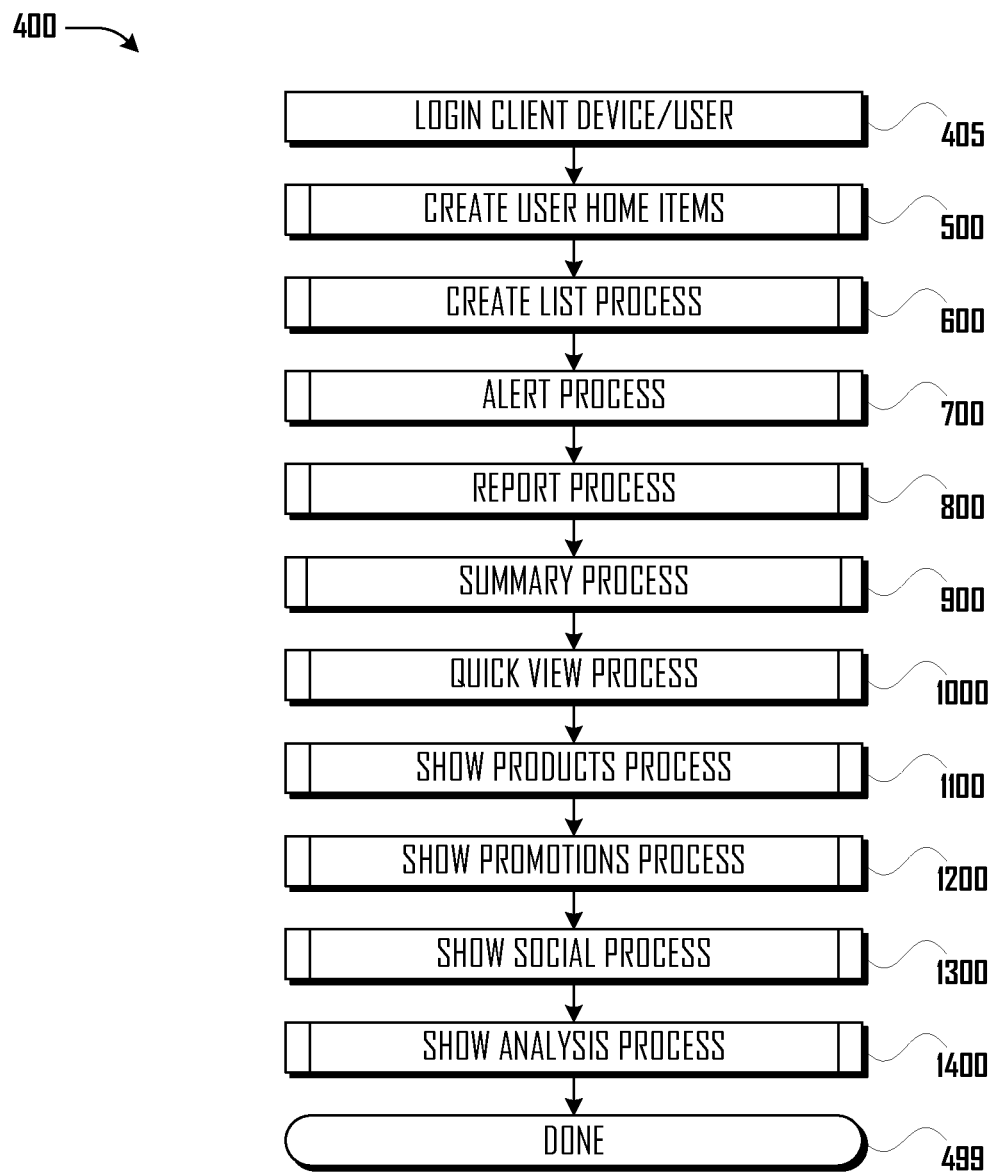
FIG. 4 illustrates an embodiment of User Interface Process.

FIG. 4 illustrates an embodiment of User Interface Process 400.

At block 405, Client Device 105 may log into, for example, User Interface Process 400. Any of processes 500 through 1400 may be executed independently by User Interface Process 400, not necessarily in the order presented in FIG. 4. Processes 500 through 1500 are discussed at great length herein.

Briefly, at block 500 in FIG. 4, Create User Home Items 500 may be executed. Create User Home Items 500 may receive, for example, user selection of User Home 305. User Home 305 may be a Brand, Merchant, or Store selected by the user, selected according to an employer of the user, or in which the user is otherwise interested. Create User Home Items 500 may also receive identification and/or selection of Competitor 310, Products 327 of interest to the user, and user designation of link(s) between Products 327. Create User Home Items 500 may also set two or more Products 327 as "Substitutes" if the number of user designated links between the Products 327 exceeds a threshold. Create User Home Items 500 is described further in relation to FIG. 5.

At block 600 in FIG. 4, Create List Process 600 may be executed. Create List Process 600 may receive a list of Products 327—a "custom list"—and/or criteria for including Products 327 in a list—a "smart list". The criteria for including Products 327 in a list may comprise a Category, a Brand, a Store or the like. Create List Process 600 is described further in relation to FIG. 6.

At block 700 in FIG. 4, Alert Process 700 may be executed. Alert Process 700 is a process wherein users can set alerts to occur when one or more targets (such as a Product 327 or a Category 335 of Products 327) obtains a specified criteria, such as an absolute or relative change in price, or price ratio relative to another target, or changes availability at a Store (such as becomes available or is no longer available). Alert Process 700 is described further in relation to FIG. 7.

At block 800 in FIG. 4, Report Process 800 may be executed. Repot Process 800 is a process wherein users can create customized reports and set re-pricing commands. Report Process 800 is described further in relation to FIG. 8.

At block 900 in FIG. 4, Summary Process 900 may be executed. Summary Process 900 is a process wherein summaries of Insight Information 330 records may be customized for and presented to a user. Summary Process 900 is described further in relation to FIG. 9.

At block 1000 in FIG. 4, Quick View Process 1000 may be executed. Quick View Process 1000 is a process wherein a user may obtain multiple types of Insight Information 330 records and output them with color. Quick View Process 1000 is described further in relation to FIG. 10.

At block 1100 in FIG. 4, Show Products Process 1100 may be executed. Show Products Process 1100 is a process wherein a user may obtain, refine, and sort information relating to User Home Items and User Lists, as described further in relation to FIG. 11.

At block 1200 in FIG. 4, Show Promotions Process 1200 may be executed. Show Promotions Process 1200 is a process wherein information regarding Products 327 on sale may be output to a user. Show Promotions Process 1200 is described further in relation to FIG. 12.

At block 1300 in FIG. 4, Show Social Process 1300 may be executed. Show Social Process 1300 is a process wherein information regarding social network events may be output to a user. Show Social Process 1300 is described further in relation to FIG. 13.

At block 1400 in FIG. 4, Show Analysis Process 1400 may be executed. Show Analysis Process 1400 is a process wherein Insight Information 330 relating to a Brand, Category, User List or the like may be adjusted, refined, and assigned to a user dashboard. Show Analysis Process 1400 is described further in relation to FIG. 14.

Occurring within one or more of the routines of User Interface Process 400 (as discussed in relation to such routines, herein), Recommendation Process 1500 may be executed to produce recommendations to increase or decrease a price, to add or remove a Product from inventory, or to increase or decrease promotion of a Product.

Figure 5:
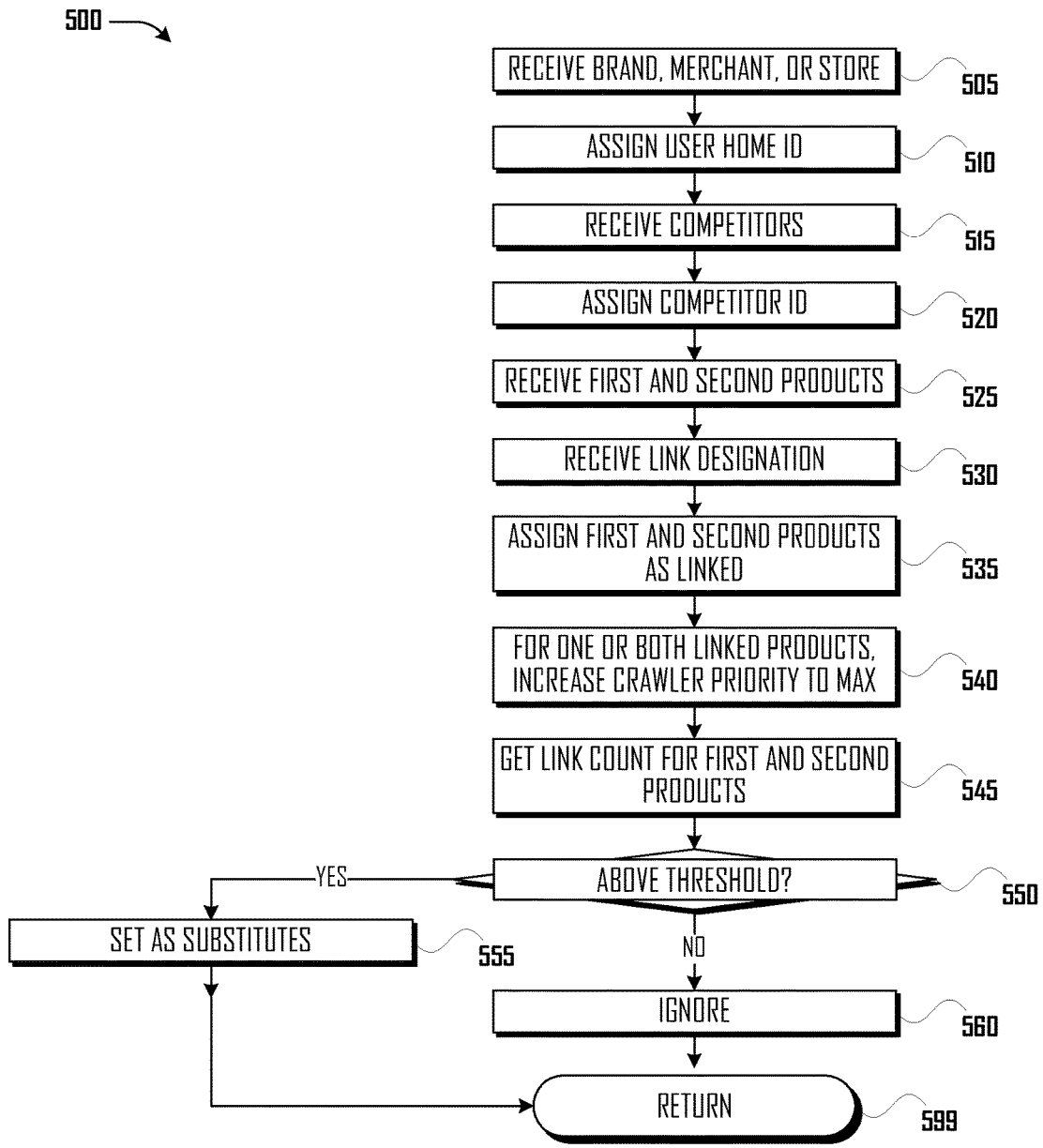
FIG. 5 illustrates an embodiment of Create User Home Items.

FIG. 5 illustrates an embodiment of Create User Home Items 500 routine. At block 505, User Home 305—such as a Brand, Merchant, and/or Store with which the user is associated or in which the user is interested—is received, such as from the user via Client Device 105, and stored. If the user is employed by a corporation or another organization, and if the corporation is obtaining services from Indix Server 200, User Home 305 may be set by the employer. At block 510, an identifier may be assigned to the User Home 305 of block 505, which identifier may be recorded in a User Home 305 record associated with the user.

At block 515, competitors of User Home 305 may be received from the user, from a service, from an employer, and/or may be assigned by Create User Home Items 500 process, such as according to Competitor 310 record. Competitor 310 may be determined by, for example, "Competition Routine 1100" described in U.S. patent application Ser. No. 13/951,248. In brief, with respect to Stores, Brands, and Merchants, Competitors 310 may be determined by identifying Stores, Brands, and Merchants which share a threshold level of the same Products 327, such as 70%. Create User Home Items 500 process may receive an assigned Competitor 310 from the user or Create user Home Items 500 may suggest or assign competitors of User Home 305, which suggested or assigned competitors may be confirmed by the user. Create User Home Items 500 may show the user the competitors which other users have selected in relation to User Home 305 selected or assigned in block 505 and may allow the user to select from or approve such competitors. At block 520, Competitor 310 identifier may be assigned to or associated with the competitors of User Home 305 received at block 515.

At block 525, first and second Products 327 may be received. At block 530, a designation may be received to link the first and second Products 327 of block 525. At block 535, the first and second Products 327 of block 525 may be linked as Linked Products 315. At block 540, crawling performed by the Crawl Agent 110 may be increased (such as to the maximum) for one or both of the Linked Products 315 with respect to URI's associated with the Linked Products 315. The increase may have a temporal effect on the behavior of the Crawl Agent 110 and may be influenced by the frequency with which the first and second Products 327 of block 525 are also Linked Products 315 by the same or different users.

At block 545, the link count—which measures the frequency with which the first and second Products 327 of block 525 are also Linked Products 315 by the same or different users—is obtained.

At block 550, a determination may be made regarding whether the link count is above a threshold. If so, then at block 555, the Linked Products 315 may be set as "Substitutes" in, for example, "Insights Routine 700" described in U.S. patent application Ser. No. 13/951,248. If not, then at block 560, the below-threshold link count may be ignored.

At block 599, Create User Home Items 500 ends or returns to FIG. 4, block 500, or to another process which may have called Create User Home Items 500.

Figure 6:
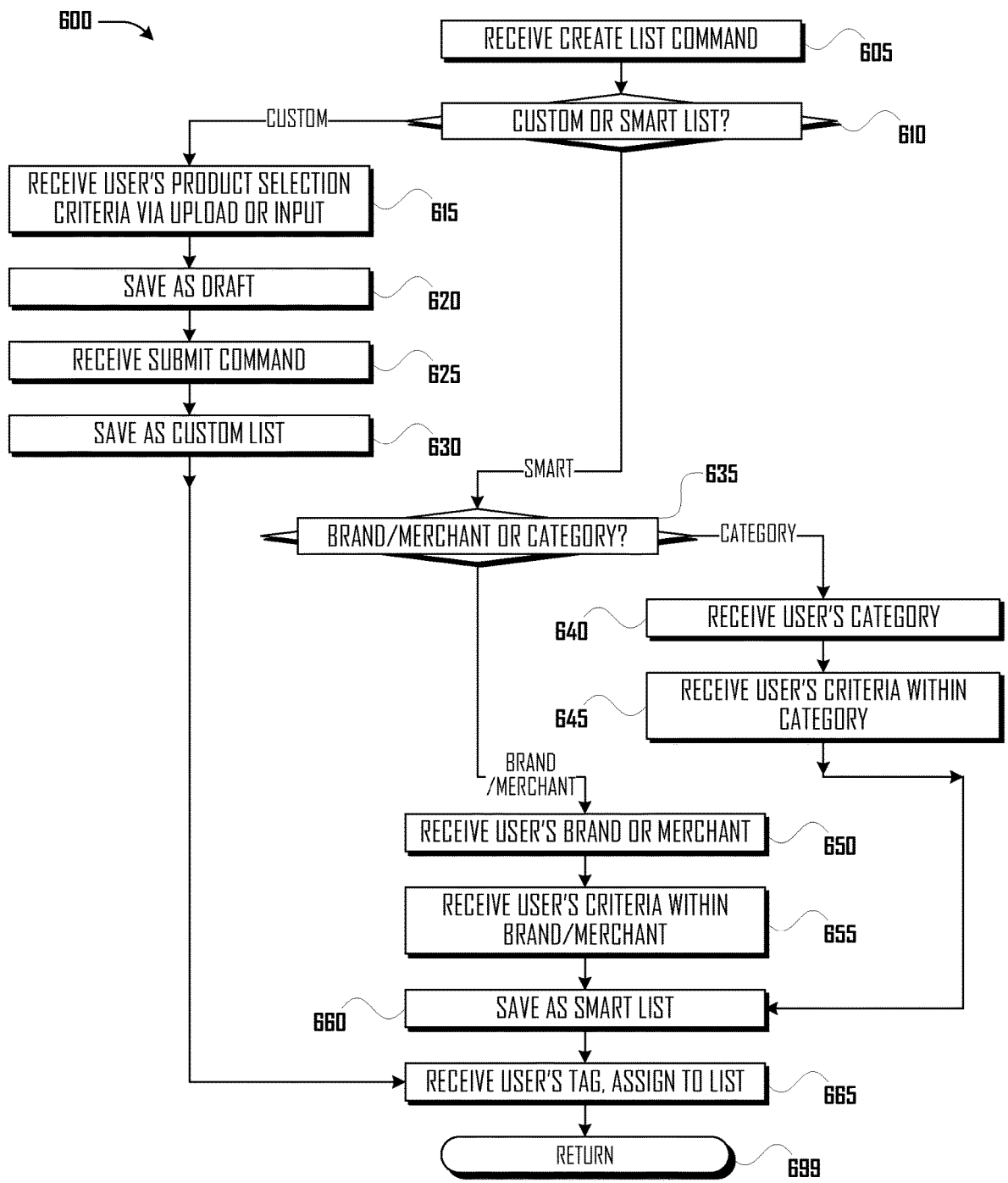
FIG. 6 illustrates an embodiment of Create List Process.

FIG. 6 illustrates an embodiment of Create List Process 600.

At block 605, a create list command may be received from a user or another process. The create list command may create a User List 320 record. At block 610, a determination may be made (or equivalent logic implemented) regarding whether the create list command is in relation to a custom list or a smart list; a custom list may be a list of Products 327 or another list uploaded by the user, an employer, or the like while a smart list may be a selection by a user, employer, or the like of a User Home 305 or a Category 335.

If, at block 610 the determination was a custom list, then at block 615 the user's product selection for inclusion in the custom list may be received. For example, Products 327 may be selected by the user (or an employer) from a list or catalog, via search results, via browsing a catalog, and the like; the product selection may be in relation to a User Home 305 or a Competitor 310, such as Products 327 associated with the user's User Home 305 or Competitor 310; the product selection may further be in relation to a list of products uploaded to the Create List Process 600 by the user. In this and other steps discussed herein, when a user uploads a list of products to a process, the uploaded list may be normalized relative to the Products 327 maintained in the Indix Database 300, which normalization may involve interaction with the user to clarify any ambiguous or undeterminable items, with the output thereof being used in the relevant process.

At block 620 the selected or identified products may be saved as a draft, which may allow the list to be refined by the user at a later date. At block 625 a submit command or equivalent may be received from the user and, at block 630, the product list may be saved as or in association with a User List 320 record.

If, at block 610 the determination was that a smart list was to be created, then at block 635 a determination may be made regarding whether the smart list is in relation to a Brand or Merchant (or Store) or a Category 335. The Brand or Merchant may be a User Home 305, User Home Item or a selection of a Brand or Merchant from a navigable list presented to the user for this purpose. An example Category 335 record may be as follows: apparel/shoes/women/high heel.

If, at block 635, the determination was of a category, then at block 640 the user's selection of a Category 335 may be received. At block 645 additional criteria which may be used to limit or refine Category 335 or block 640 may be received. For example, if the user selected a "high heel" Category 335, the user may further be able to refine the list according to a Brand within this Category 335 or all items in the Category 335 over a certain price level (such as all high heels over $50), or available by or from a certain Brand or Merchant, or at a Store, or within a sub-category with Category 335.

If, at block 635 the determination was made to select a Brand or Merchant, then at block 650 the selected Brand or Merchant (which may be a User Home 305) may be received. At block 655 the user's criteria within the Brand or Merchant may be received. For example, if the user selected a Merchant, the user may further be able to refine the list according to a Brand sold by the Merchant, Brands at a particular Store of the Merchant, or Products over a certain price level; if the user selected a Brand, the user may further be able to refine the list according to specific products within the Brand or products within the Brand over a certain price level.

At block 660, the selected and refined Brand or Merchant information may be saved as a smart list.

At block 665, a user tag, name, or identifier may be received from the User, saved as User Tag 380, and assigned to User List 320. User Tag 380 may be used to identify the User List in other routines.

At block 699, Create List Process 600 ends or returns to FIG. 4, block 600, or to another process which may have called Create List Process 600.

Figure 7:
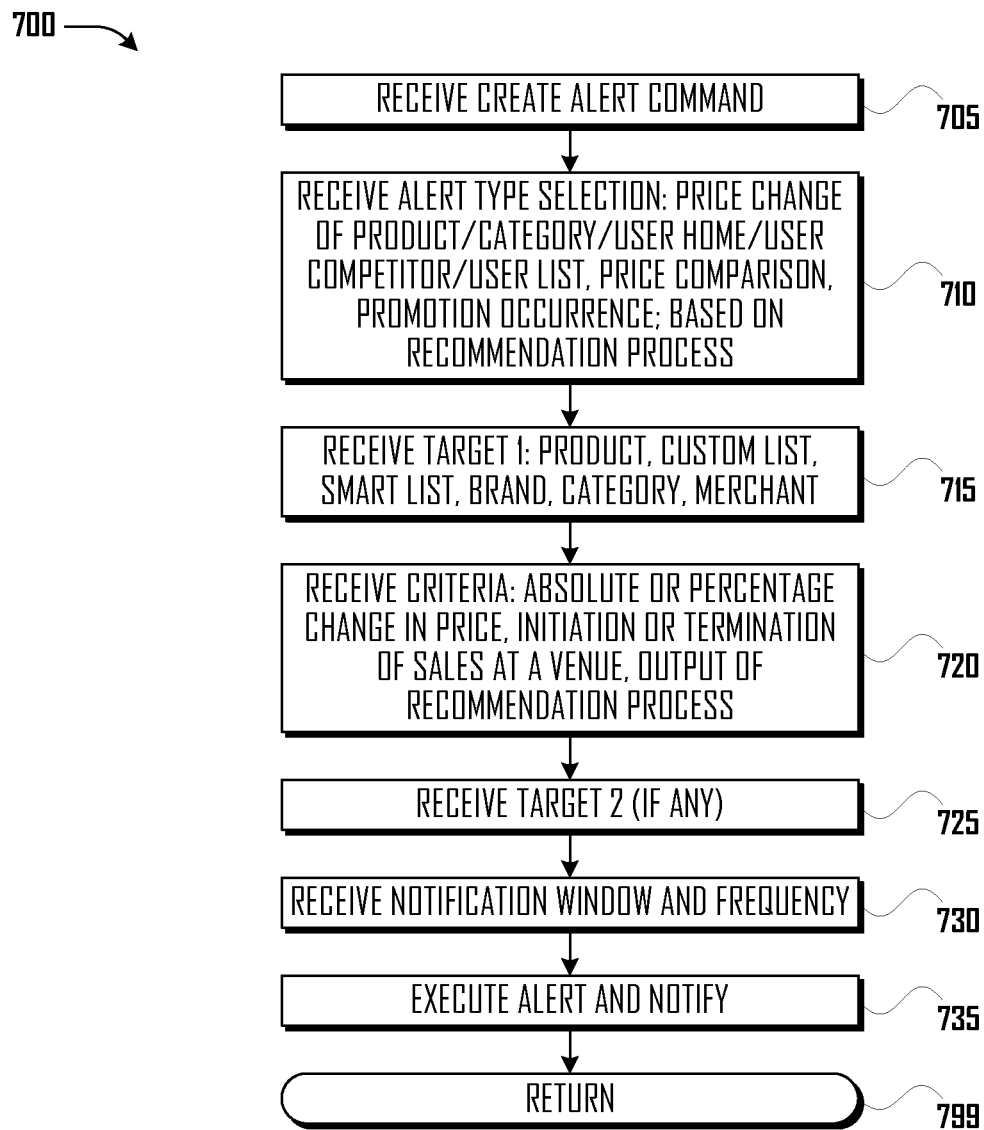
FIG. 7 illustrates an embodiment of Alert Process.

FIG. 7 illustrates an embodiment of Alert Process 700.

At block 705, a create alert command may be received from a user or another process. At block 710, an alert type selection may be received. The alert types may be, for example, an alert based on a price change of a Product 327, Products in a Category 335, a User Home 305, a Competitor 310, a User List 320, based on a price comparison between two or more Products 327, Categories 335, User Home 305, Competitor 310, Products in a User List 320, based on a promotion or withdrawal of promotion of (such as advertised or actual percentage change in price) a Product 327, User Home 305, Competitor 310, or a User List 320, and the like. The alert type may be responsive to, for example, the output of Recommendation Process 1500 and a recommendation of a type or with a specified value.

At block 715, Alert Process 700 may receive and save the first target of the alert command, such as a Product 327, User Home 305, Competitor 310, User List 320, or a user selection of a Brand, Merchant, or Category 335.

At block 720 the criteria for the alert may be received and saved, such as whether the alert will be triggered upon an increase or decrease of a price of the first target, either absolutely relative to an earlier value, as a percentage relative to an earlier value, or absolutely or as a percentage relative to a second target, whether a product has gone on a promotion, has been discontinued, is not available, or based on a defined recommendation being generated by Recommendation Process 1500, or the like.

At block 725, the second target, if any (as in the case of a comparison between products), may be received and saved.

At block 730, the notification window, frequency, and other notification criteria of the alert may be received and saved.

At block 735, the alert may be executed or may be set to be executed and notifications resulting therefrom may be sent.

At block 799 Alert Process 700 ends or returns to FIG. 4 and block 700 or to another process which may have called Alert Process 700.

Figure 8:
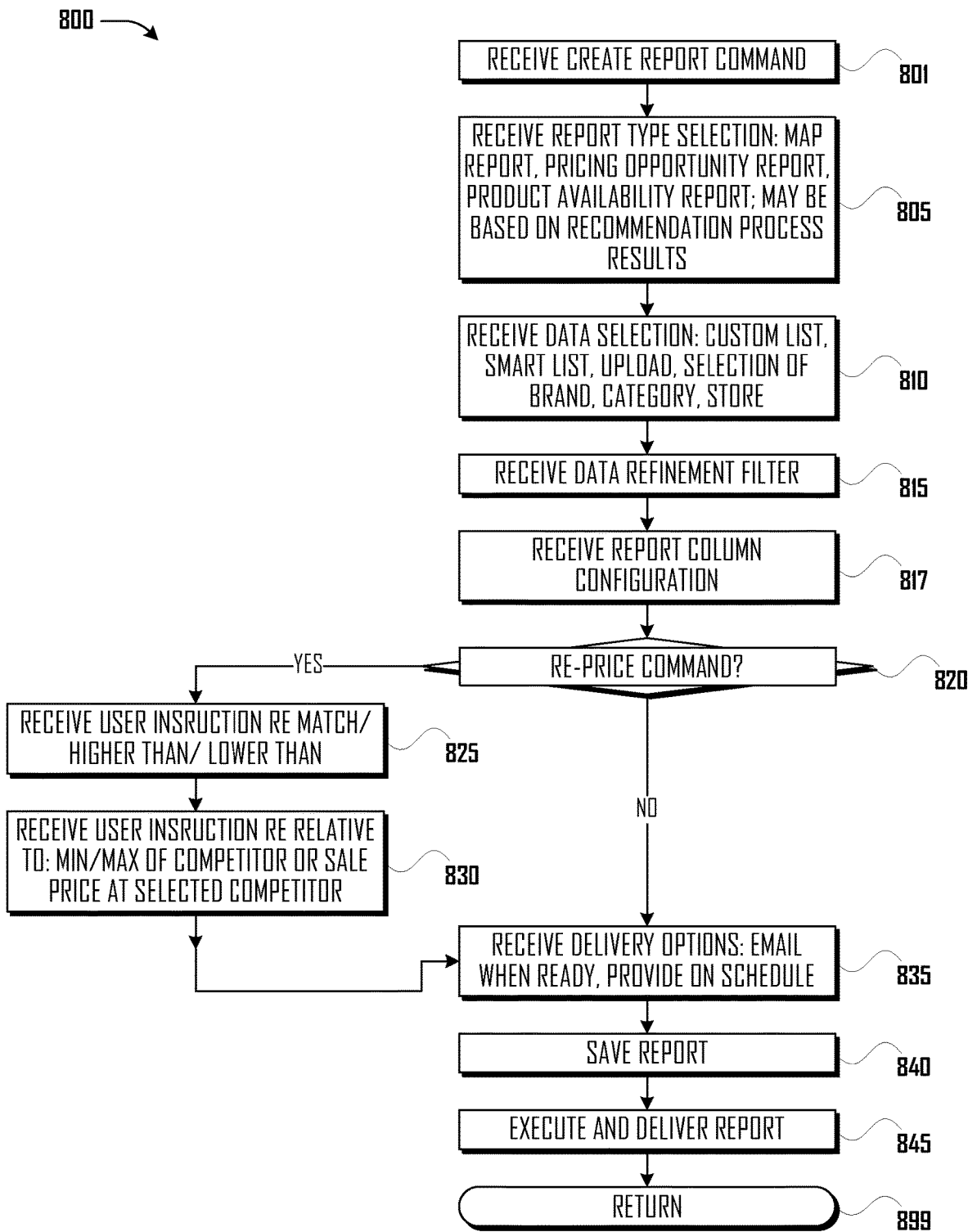
FIG. 8 illustrates an embodiment of Report Process.

FIG. 8 illustrates an embodiment of Report Process 800.

At block 801, a create report command may be received from a user or another process. At block 805, a report type selection may be received from a user or another process. The report types may be, for example, a "MAP" report in relation to products that are priced below a minimum advertised price, a pricing opportunity report in relation to products that are priced above or below a competitor's price, or a product availability report in relation to products that are out of stock. The report type may be based on a result of Recommendation Process 1500.

At block 810, a data selection for the report may be received from a user or another process. The data selection may be a User List 320, such as a Custom or Smart List, a selection of a Brand, Category 335, or Merchant, Store, an uploaded list, or the like.

At block 815, data refinement selections may be received from a user or another process. The data refinements may comprise criteria such as, for example, "where the price of X product at Y Store is higher/lower than the minimum or maximum of a price for X product at Competitor 310 by at least a specified amount."

At block 817, report column configuration settings may be received, such as to include or not include in the report a product title, a product SKU, a Brand name, an MPN, a UPC, a difference from lowest competitor, a "my sale price", a sale price across competitors, and the like.

At block 820 a determination may be made regarding whether a re-price command is received or programmed. A re-price command may be an instruction to re-price, add, or remove a product in response to conditions or information in a report. If so, then at block 825, a user instruction to match, price higher than or price lower than may be received. At block 830, a user instruction may be received that the re-price instruction is relative to a minimum or maximum of a competitor's price or a sale price at a selected competitor.

At block 835, delivery options for the report may be received from a user or another process. The delivery options may be, for example, whether the report is to be emailed when ready (which may include emailing a spreadsheet or a link to a spreadsheet or the like) or provided on a schedule, or the like.

At block 840, the report may be saved as or in, for example, a Report 350 record.

At block 845, the report may be executed or may be scheduled to be executed and the result thereof delivered.

At block 899, Report Process 800 ends or returns to FIG. 4 and block 800 or to another process which may have called Report Process 800.

Figure 9:
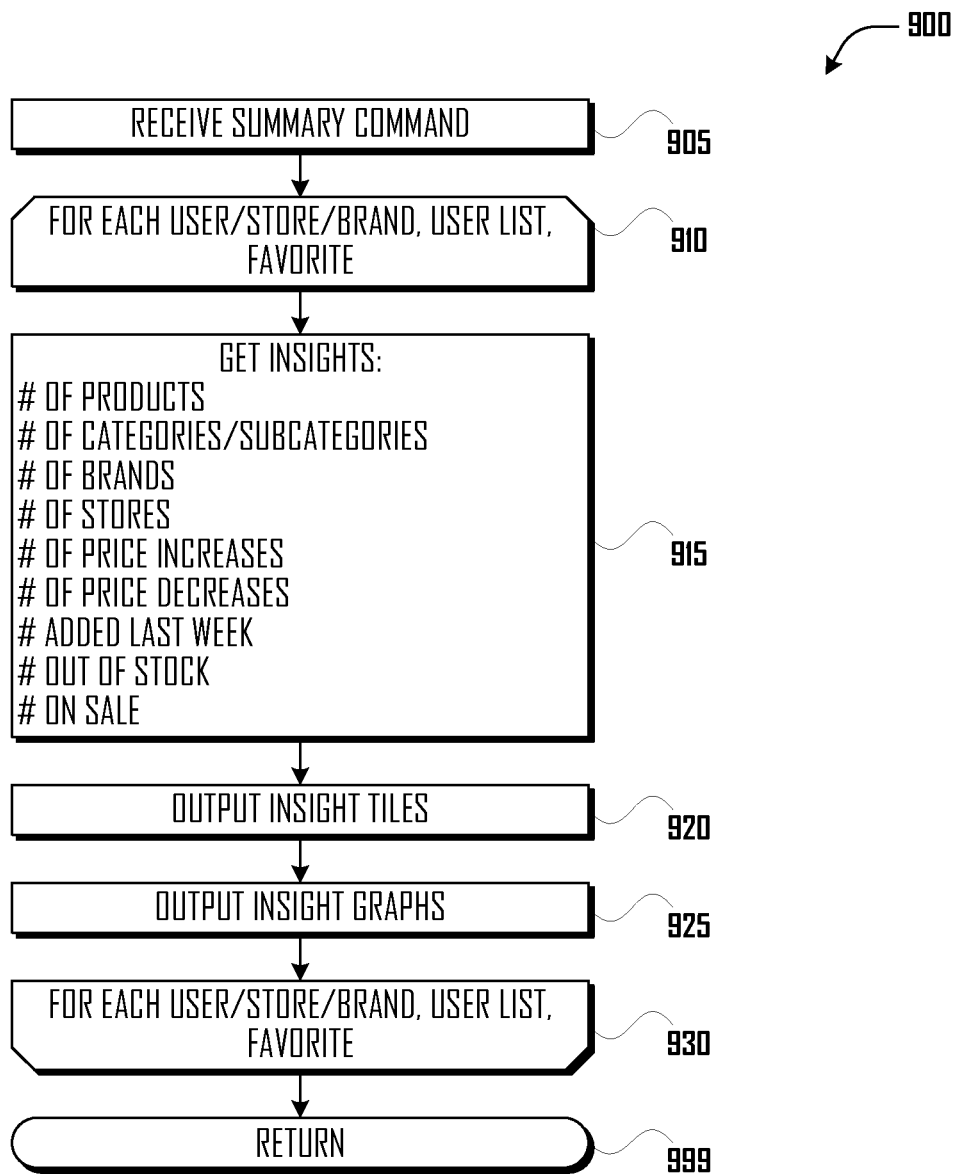
FIG. 9 illustrates an embodiment of Summary Process.

FIG. 9 illustrates an embodiment of Summary Process 900.

At block 905, a summary command may be received from a user or another process. The summary may be a default setting of the user interface.

Beginning in opening loop block 910, Summary Process 900 processes each User Home Item, User List 320, favorite or other user selection in turn.

At block 915, Insight Information 330 for each item of block 910 may be obtained. Insight Information 330 is the output of analytic processes ("Insights 375" determined by "Insights Routine 600" as described in U.S. patent application Ser. No. 13/951,248) which analytic processes identify, for example, price changes, and what Product Attributes 345 and Price Attributes 340 across the datasets are associated with changes in price. Insight Information 330 may comprise, for example, a number of products, number of categories or subcategories, number of Brands, number of Merchants, number of Stores, number of price increases or decreases, number added in the last week or other date-time unit, number out of stock, number on sale, or the like.

At block 920, tiles comprising a numeric value of the Insight Information 330 of block 915 may be output. At block 925, graphs comprising a graphical representation of the Insight Information 330 of block 915 may be output.

In ending loop block 930, Summary Process 900 iterates back to opening loop block 910 to process the next User Home Item, User List 320, favorite or other user selection, if any.

At block 999 Summary Process 900 ends or returns to FIG. 4 and block 900 or to another process which may have called Summary Process 900.

Figure 10:
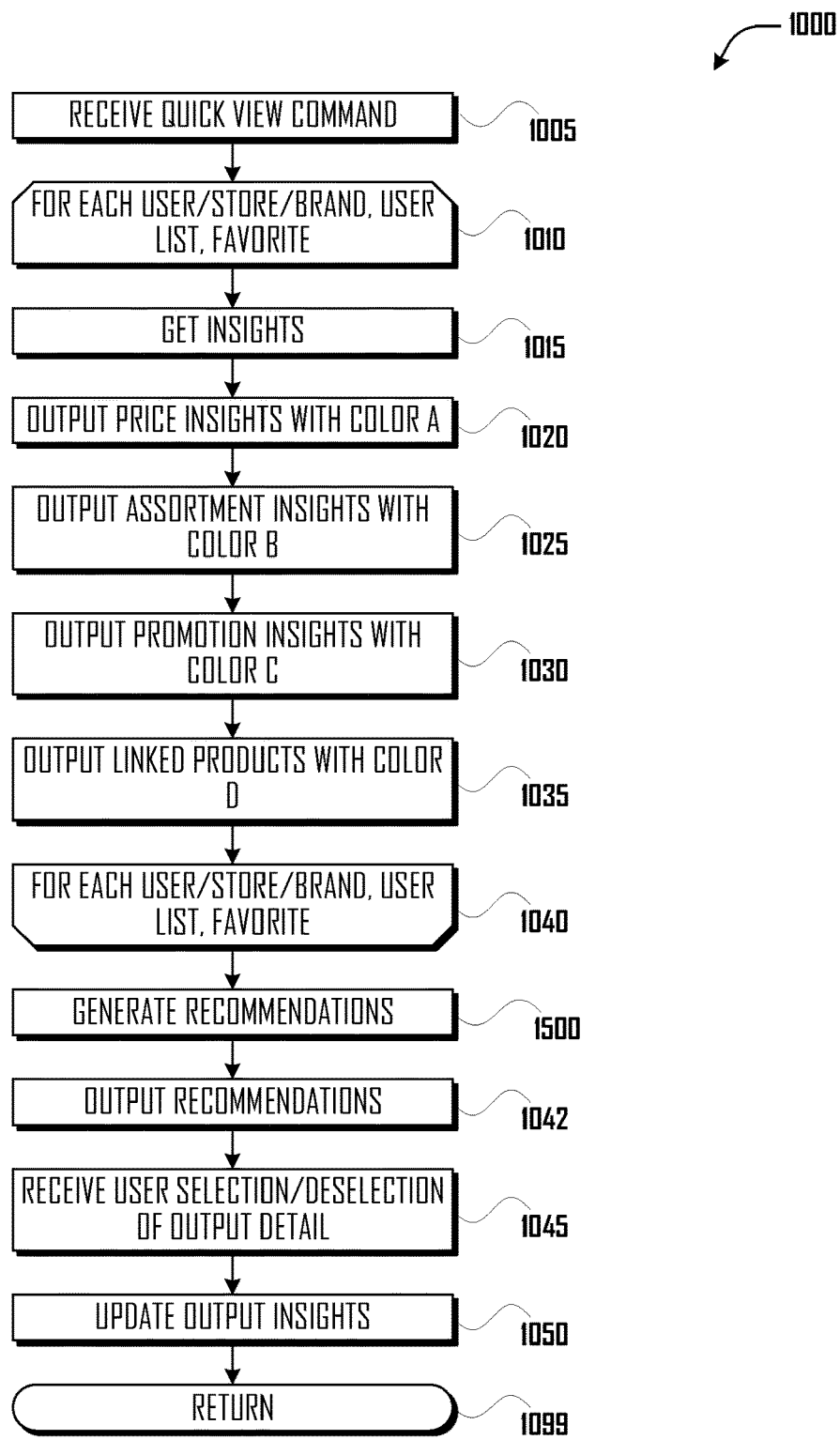
FIG. 10 illustrates an embodiment of Quick View Process.

FIG. 10 illustrates an embodiment of Quick View Process 1000.

At block 1005, a quick view command may be received from a user or another process.

Beginning in opening loop block 1010, Quick View Process 1000 processes each User Home Item, User List 320, favorite or other user selection in turn.

At block 1015, Insight Information 330 for each item of block 1010 may be obtained. The Insight Information 330 is described in relation to block 915 and elsewhere and may comprise, for example, a number of products, number of categories or subcategories, number of Brands, number of Stores, number of price increases or decreases, number added in the last week or other date-time unit, number out of stock, number on sale, or the like.

At block 1020, price-related Insight Information 330 may be output in association with a color A.

At block 1025, assortment-related Insight Information 330 may be output in association with a color B.

At block 1030, promotion-related Insight Information 330 may be output in association with a color C.

At block 1035, Linked Products 315 may be output in association with a color D.

In ending loop block 1040, Quick View Process 1000 iterates back to opening loop block 1010 to process the next item, if any.

At block 1500, recommendations regarding whether Products may be added or removed from inventory, or whether the price of a Product may be increased or decreased, or whether a Product should be promoted more or less may be obtained by executing Recommendation Process 1500.

At block 1042, the recommendations generated at block 1500 may be output, for example, to Client Device 105.

At block 1045, a user selection or deselection of an output detail of blocks 1010 to 1040 and of 1042 may be received. The user selection or deselection may, for example, allow the output detail to be shown or not shown.

At block 1050, the output may be updated to reflect the selection or deselection of block 1050.

At block 1099 Quick View Process 1000 ends or returns to FIG. 4 and block 1000 or to another process which may have called Quick View Process 1000.

Figure 11:
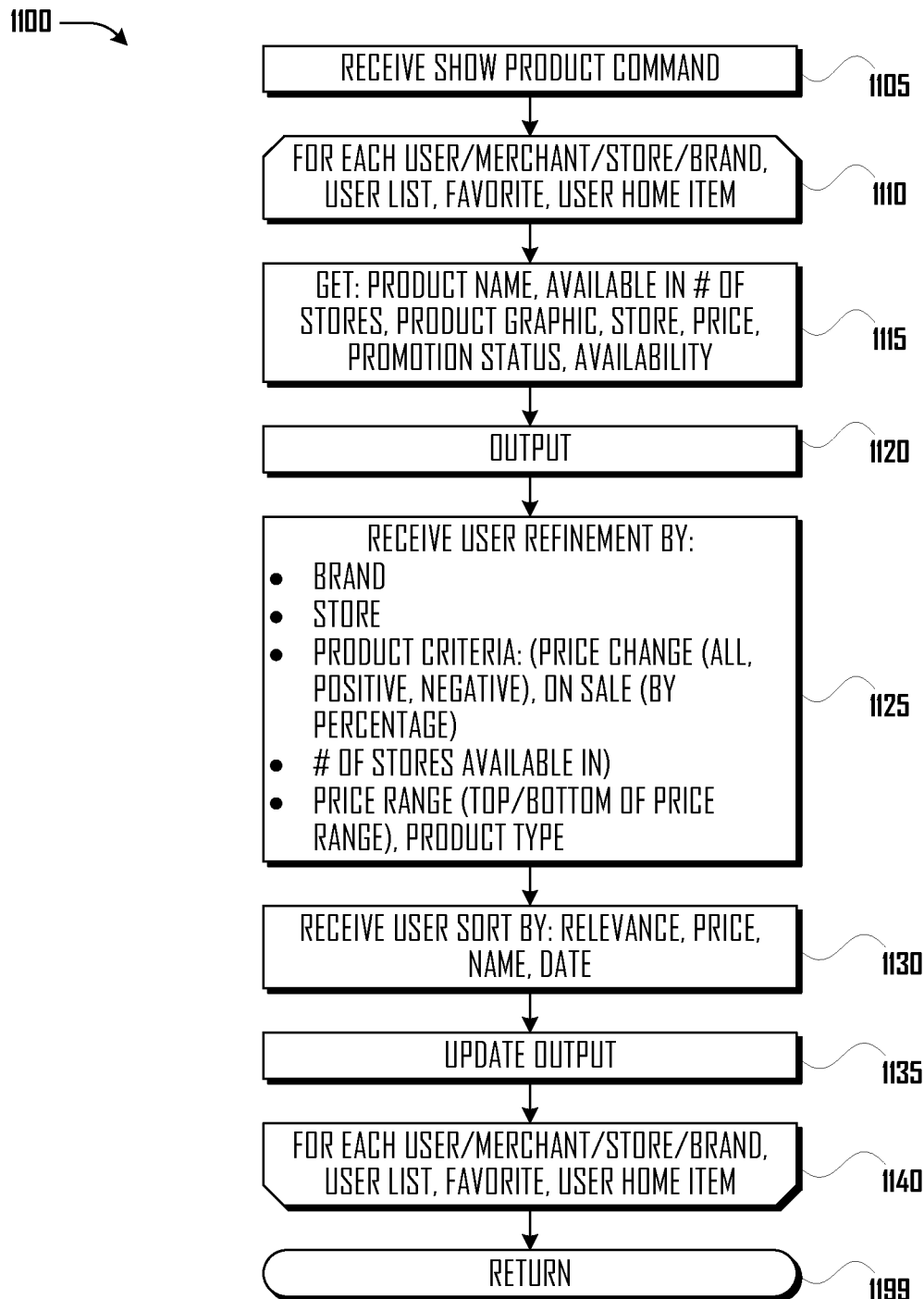
FIG. 11 illustrates an embodiment of Show Products Process.

FIG. 11 illustrates an embodiment of Show Products Process 1100.

At block 1105, a show product information command may be received from a user or another process.

Beginning in opening loop block 1110, Show Products Process 1100 processes each User Home Item, User List 320, favorite or other user selection in turn.

At block 1115, the product name, available in number of Stores, product graphic, Store, price, promotion status, availability and the like information may be obtained, such as from Price Attribute 340, Product Attribute 345, or Parse Result 325 records (described at greater length in U.S. patent application Ser. Nos. 13/951,248 and 13/951,244). At block 1120, the information of block 1115 may be output, for example, to Client Device 105.

At block 1130, user sort criteria may be received, such as sort-by relevance, price, name, date, or the like.

At block 1135, the output may be updated according to the user sort criteria.

In ending loop block 1140, Show Products Process 1100 iterates back to opening loop block 1110 to process the next item, if any.

At block 1199 Show Products Process 1100 ends or returns to FIG. 4 and block 1100 or to another process which may have called Show Products Process 1100.

Figure 12:
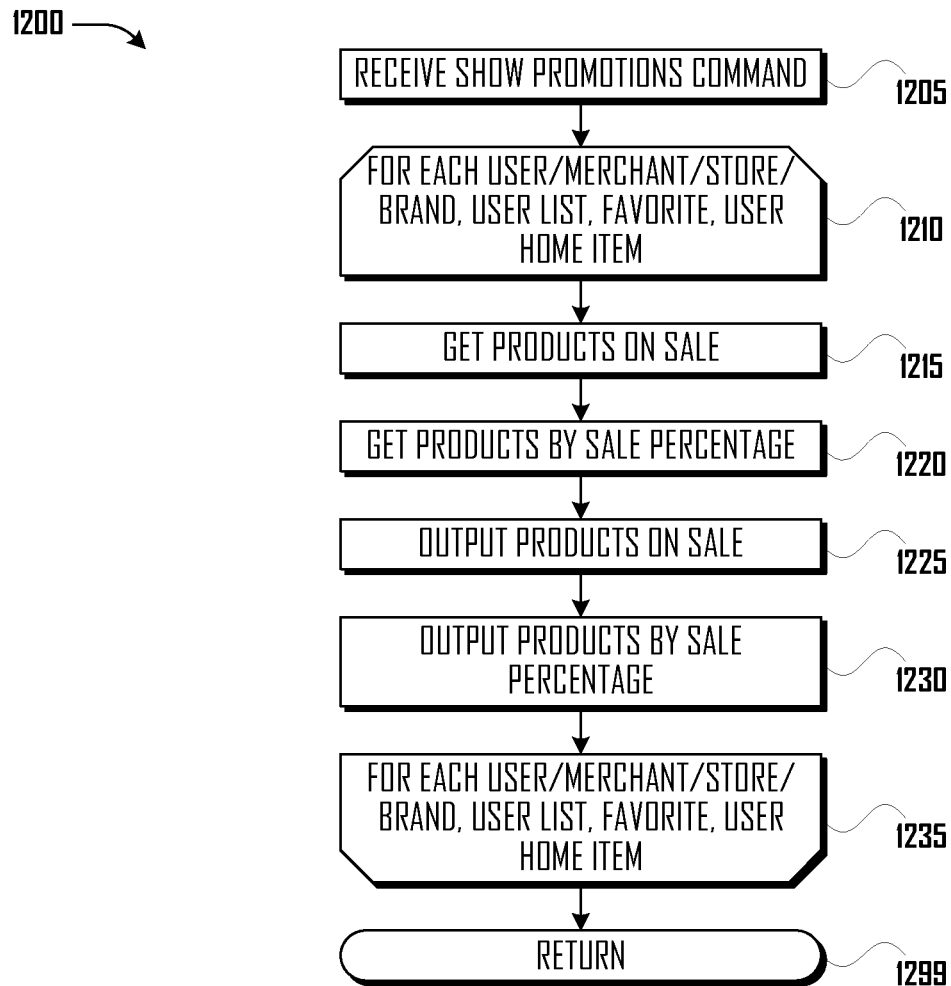
FIG. 12 illustrates an embodiment of Show Promotions Process.

FIG. 12 illustrates an embodiment of Show Promotions Process 1200.

At block 1205, a show promotion information command may be received from a user or another process.

Beginning in opening loop block 1210, Show Promotions Process 1200 processes each User Home Item, User List 320, favorite or other user selection in turn.

At block 1215, Show Promotions Process 1200 gets the products which are on sale, as may be advertised by the merchant or Store or as may be determined relative to a standard or average retail price. Determination of whether a product is on promotion may be performed, for example, by a "Promotions Insight", as described in U.S. patent application Ser. No. 13/951,248, for example, in relation to "Promotion Routine 1200" therein). At block 1220, the Show Promotions Process 1200 gets the products which are on sale by various percentage amounts (such as 10%, 20%, 30%, etc.), as may be advertised by the merchant or Store or as may be determined relative to a standard or average retail price.

At block 1225, the products which are on sale may be output, such as to the Client Device 105. At block 1230, the products which are on sale by various percentage amounts may be output. The output may comprise a line graph of zero to one-hundred with circles at each of 10-unit increments, with the size of the circle determined by the number of products within that sale percentage band.

In ending loop block 1235, Show Promotions Process 1200 iterates back to opening loop block 1210 to process the next item, if any.

At block 1299 Show Promotions Process 1200 ends or returns to FIG. 4 and block 1200 or to another process which may have called Show Promotions Process 1200.

Figure 13:
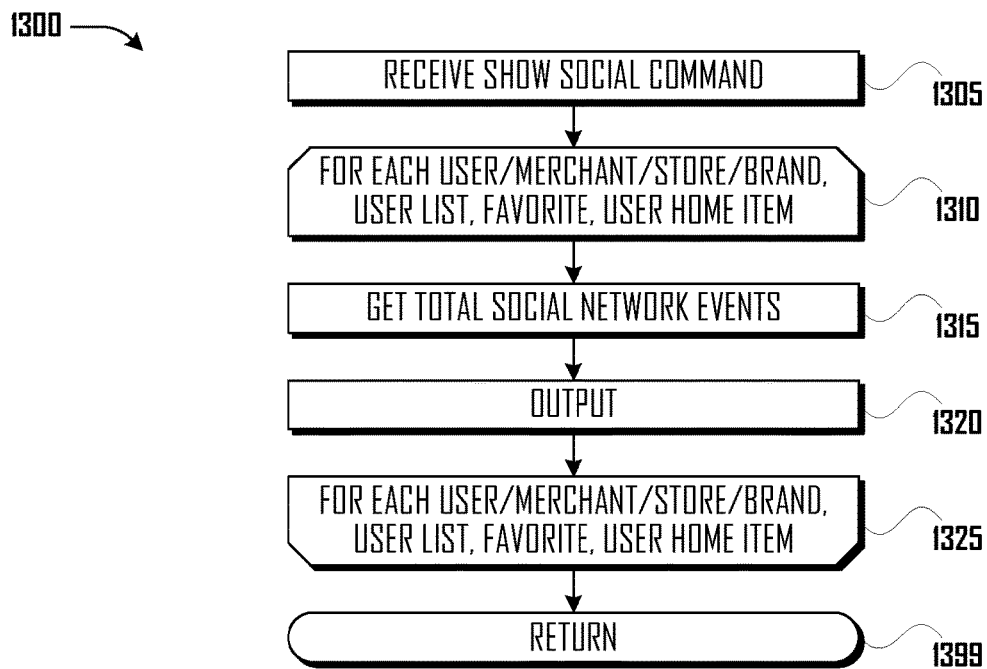
FIG. 13 illustrates an embodiment of Show Social Process.

FIG. 13 illustrates an embodiment of Show Social Process 1300.

At block 1305, a show social information command may be received from a user or another process.

Beginning in opening loop block 1310, Show Social Process 1300 processes each User Home Item, User List 320, favorite or other user selection in turn.

At block 1315, Show Social Process 1300 may obtain the total number and type of social network events associated with the item of block 1310. This may include, for example, a number of "friends", "likes", "shares", "follows", "tweets", messages mentioning the item, or the like. This information may be normalized relative to all of the items of block 1310 or relative to such events occurring with respect to a Category, such as a Category 335 of an item of block 1310 or a Category 335 selected by the user. This may be referred to in the claims as a "social metric". As an alternative, Social Signal 303 with respect to the items of block may be obtained. Social Signal 303 may be determined as described in U.S. Provisional Patent Application Ser. No. 61/952,029 and child application(s) thereof, in relation to "Social Signal Determination Process 700", described therein. At block 1320, the information of block 1315 may be output, such as to Client Device 105.

In ending loop block 1325, Show Social Process 1300 iterates back to opening loop block 1310 to process the next item, if any.

At block 1399 Show Social Process 1300 ends or returns to FIG. 4 and block 1300 or to another process which may have called Show Social Process 1300.

Figure 14:
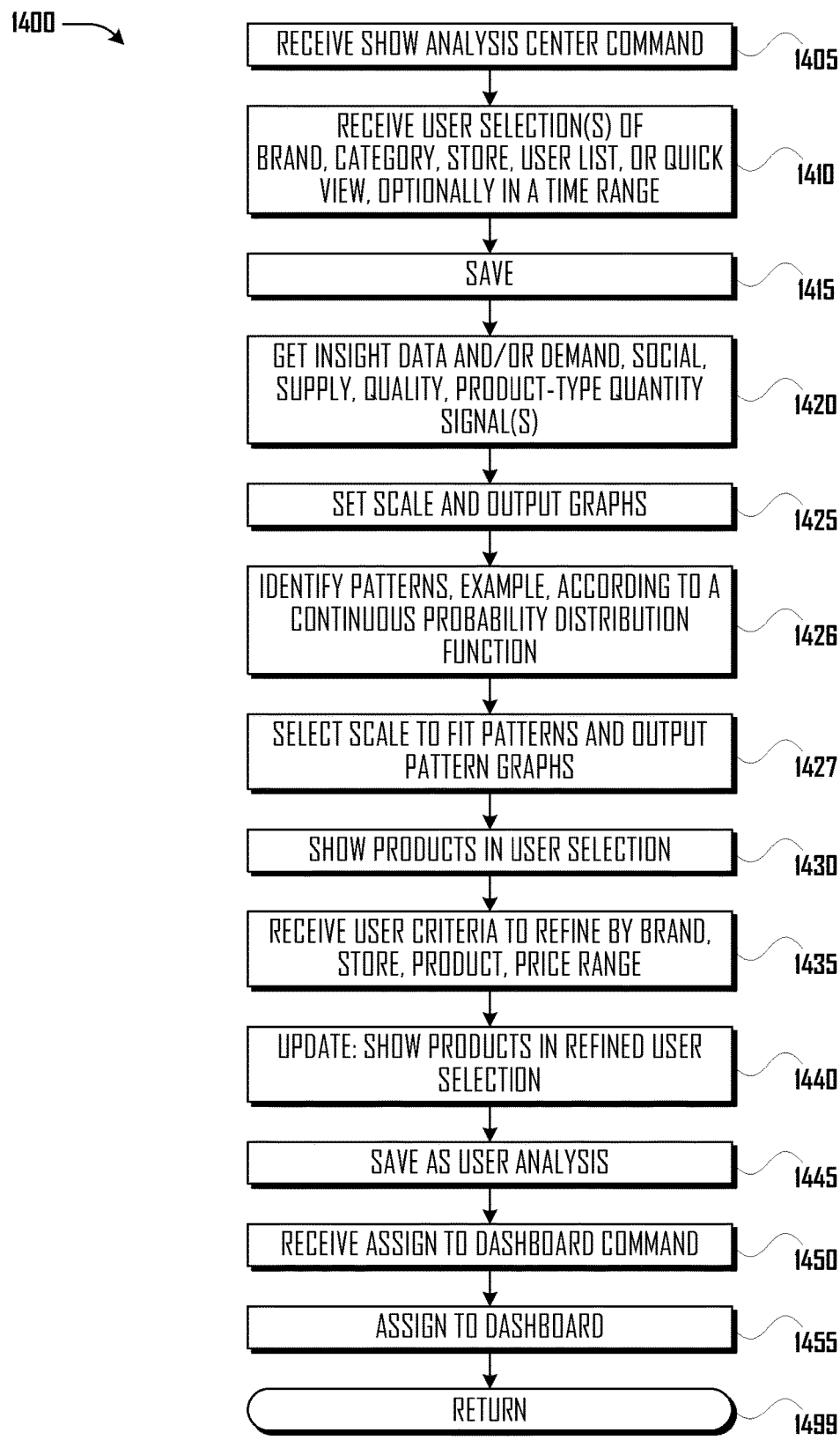
FIG. 14 illustrates an embodiment of Show Analysis Process.

FIG. 14 illustrates an embodiment of Show Analysis Process 1400.

At block 1405, a show analysis center command may be received from a user or from another process.

At block 1410, a user selection of a Brand, Merchant, Store, User Home 305, User Home Item, a Category 335, a User List 320, or a quick view may be received. More than one such selection may be received, each of which may be added to a separate tab in the UI for Show Analysis Process 1400. At block 1415, the selection(s) may be saved.

At block 1420, one or more sets of Insight Information 330 relating to the user selection(s) of block 1410 may be obtained. Insight Information 330 and examples thereof are discussed above, in relation to Summary Process 900. Which Insight Information 330 to obtain may be a default setting or may be specified by the user. In addition, or instead, signals may be obtained, such as Demand Signal 301, Supply Signal 302, Social Signal 303, Quality Signal 304, and Product-Type Quantity Signal 306. These Signals may be determined as described in U.S. Provisional Patent Application Ser. No. 61/952,029 and child applications thereof, such as in relation to FIGS. 5-11 therein. These Signals may also be referred to in the claims as "metrics", such as "demand metric", "social metric", etc.

At block 1425, the scale of the graph for Insight Information 330 and signal information of block 1420 may be selected, such as to present the information in a compact form without excessive blank area. The information may then be output, such as to the Client Device 105, as one or more graphs. The output may allow the user to select an item of block 1415 to be displayed or not displayed in the graph (which may cause the graph to be re-sized).

At block 1426, patterns may be identified in the Insight Information 330 or signal information for the user selection(s) of block 1410, such as repeating patterns and/or patterns where a first pattern with respect to a first Insight Information 330 or first Signal is preceded or followed by a second pattern in a second Insight Information 330 or second Signal. Patterns which occur across more than one Insight Information 330 or Signal may require that the more than one Insight Information 330 or Signal share a common x-axis, such as that they each are part of a time-series. Pattern identification may be according to a continuous probability distribution function or another statistical analysis. Where no pattern can be identified with respect to either a single Insight Information 330/Signal or between more than one Insight Information 330/Signal, the pattern detection may return no result or may return a message indicating that no pattern was detected.

For example, at block 1410, a user may select a price of a Category 335, such as "impact wrenches" across all Merchants or with respect to a single Merchant, and a Social Signal with respect to the same Category 335 at the Merchant(s). Pattern identification may reveal that there are repeating patterns in both data sets (in the price data and in the social metric). Pattern identification may further reveal that there is a pattern between the repeating patterns in both data sets, such as that when the price for the Category "impact wrenches" is high, there is also a higher Social Signal 303. Pattern identification may reveal that the higher Social Signal 303 follows the increase in price.

At block 1427, the scale of the Insight Information 330 may be adjusted to adequately encompass patterns identified in block 1421, for example, such that the units cover the entire range, without excess empty space, and the result may be output, such as to Client Device 105.

At block 1430, the Products 327 in the user selection of block 1410 may be output to the user or another process. These may be output under a separate tab or the like.

At block 1435, user refinement of the display may be received. User refinement may comprise limiting the output to specific Brands, Merchants, Stores, Products 327, price ranges, and the like.

At block 1440, the display at the Client Device 105 may be updated to reflect the refinement of block 1435.

At block 1445, the output of block 1440 may be saved as a User Analysis 385 record. This may be in response to a command received from the user or a process.

At block 1450, a command may be received from the user or a process to assign the User Analysis 385 record of block 1445 to the "Dashboard" of the user. At block 1455, the item may be assigned to the user's Dashboard. As time unfolds, the data underlying the output of block 1440 may be updated and, as the user visits the user's Dashboard, the updated data may be visible.

Throughout this paper, items, not just those in the Analysis Center, may be assigned to a user Dashboard, for quick access to data relating to the updated version of the item. A user Dashboard may be an element in a user interface which quickly and/or persistently presents information.

At block 1499 Show Analysis Process 1400 ends or returns to FIG. 4 and block 1400 or to another process which may have called Show Analysis Process 1400.

Figure 15A:
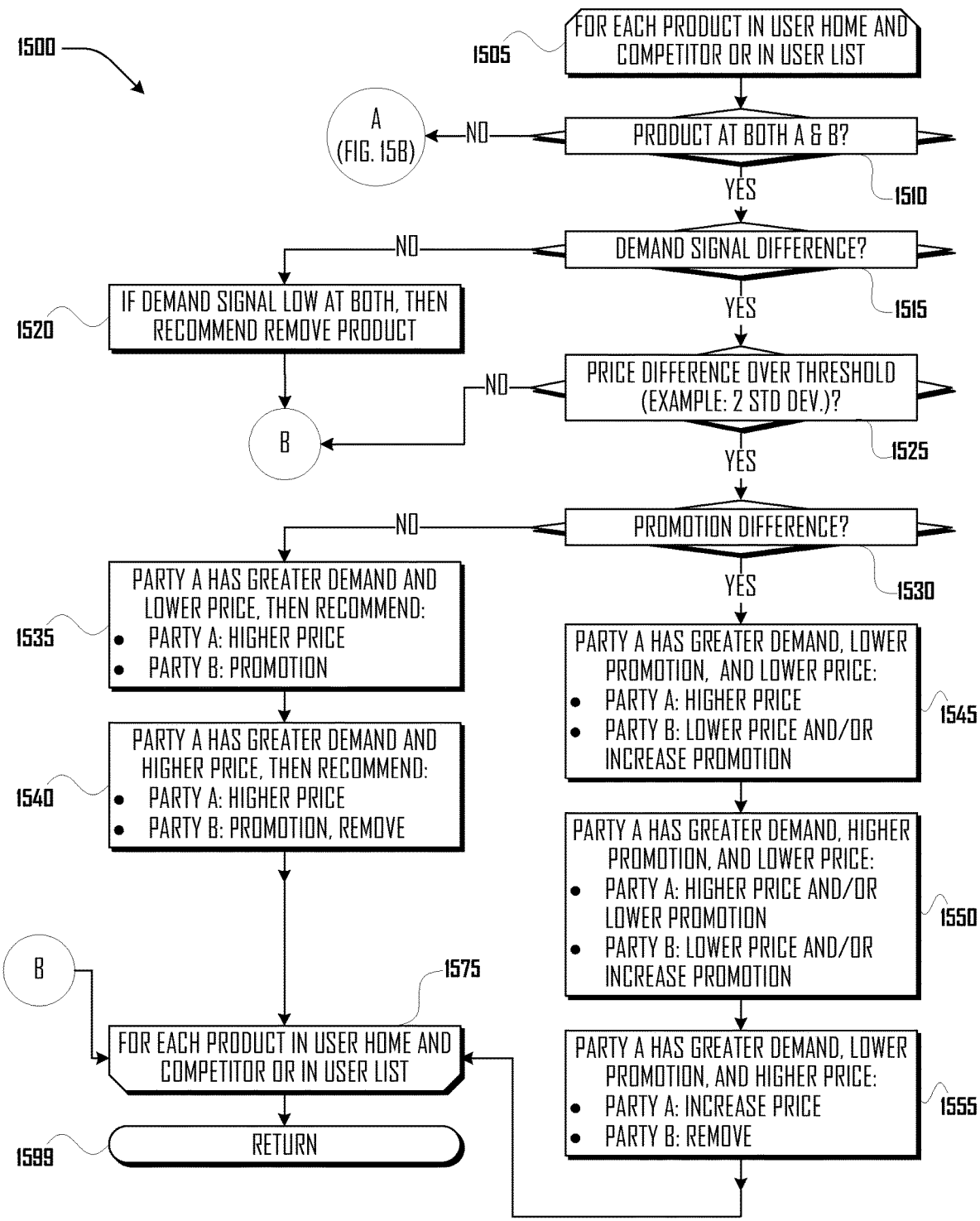
FIG. 15A illustrates a portion of an embodiment of Recommendation Process.
Figure 15B:
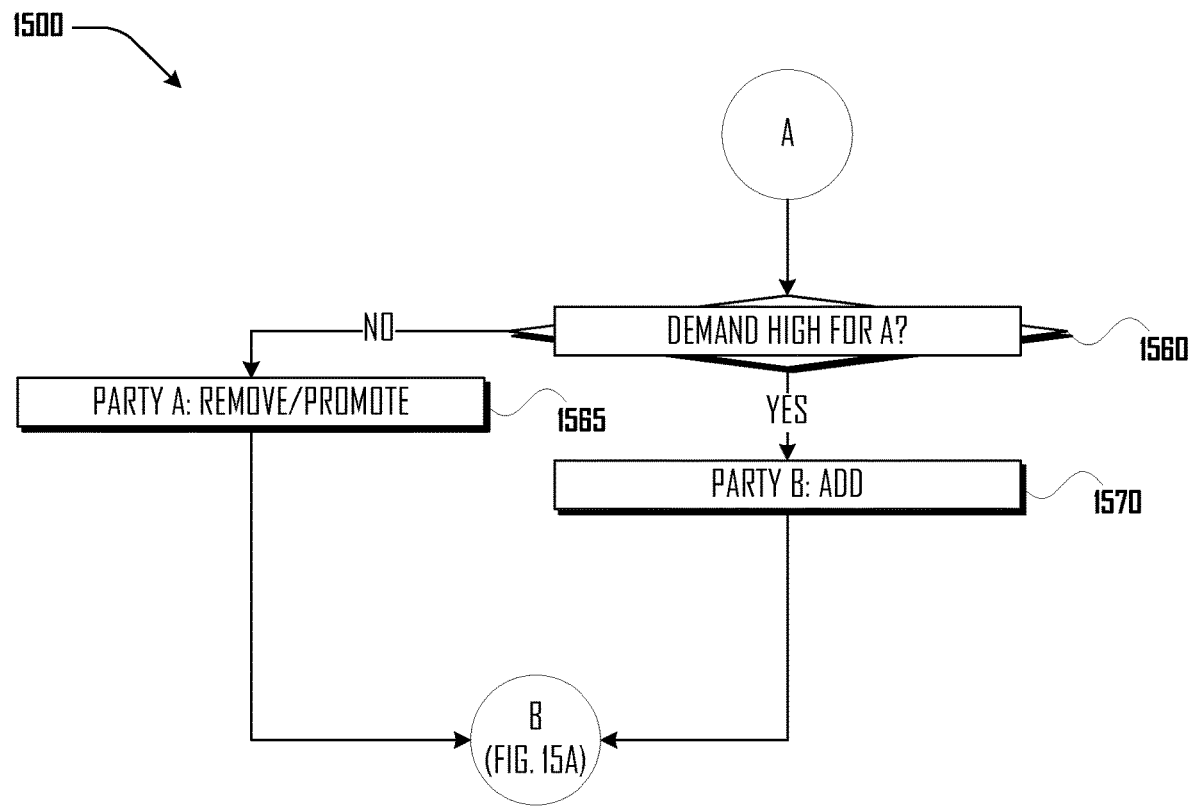
FIG. 15B illustrates a portion of an embodiment of Recommendation Process.

FIG. 15 illustrates an embodiment of Recommendation Process 1500. In discussion of this process, parties "A" and "B" are discussed. A user in a given interaction may be represented by one of these parties, in which case a recommendation to the other party may not be output. For example, if a user in an interaction is represented by "Party A", then a recommendation made (or proposed to be made) to "Party B" may not be output to the user (Party A).

Blocks 1505 to 1575 may iterate for Product pairs such as a selected i) User Home Item (comprising User Home 305 and Competitor 310) or ii) a User List comprising at least two different Merchants, Stores, Brands, or Products.

At block 1510, a determination may be made regarding whether a Product is found in both of the entities; for example, in both User Home 305 and Competitor 310 or in both of the entries in the User List.

If affirmative at block 1510, then Recommendation Process 1500 may proceed to block 1515, where a determination may be made regarding whether Demand Signal 301 is different between the two items (or groups of items) of blocks 1505 to 1575. Demand Signal 301 may be generated as described in U.S. Provisional Patent Application Ser. No. 61/952,029 and child applications thereof. Generally, Demand Signal 301 encodes the demand for a Product or set of Products in a Brand or sold by a Store, Merchant, or the like. Determination of a difference may be based on a statistically significant difference, such as two standard deviations in a probability distribution function, or a difference above a threshold.

If there is not a difference at block 1515, and if Demand Signal 301 is low at both of the items (or groups of items) of blocks 1505 to 1575, then Recommendation Process 1500 may recommend that the items be removed.

If there is a difference at block 1515, then at block 1525, a determination may be made regarding whether or not there is a price difference between the items (or groups of items). For example, a price difference may be found when there is greater than two-standard deviations in a continuous probability distribution function. If affirmative at block 1525, then at block 1530, a determination may be made regarding whether or not there is difference in promotions between the items (or groups of items). The number of promotions, the magnitude of promotions, and the duration of promotions may be generated as described in U.S. patent application Ser. No. 13/951,248 in relation to "Promotion Routine 1200" described therein, and may use data in Promotions 382 record.

If affirmative at block 1530, then blocks 1545-1555 describe a matrix. At block 1545, if Party A has greater demand (according to Demand Signal 301), lower promotion, and a lower price, then Recommendation Process 1500 may recommend to Party A that Party A has an opportunity to increase price and may recommend to Party B that Party B lower the price and/or increase promotion of the item. At block 1550, if Party A has greater demand, higher promotion, and a lower price, then Recommendation Process 1500 may recommend to Party A that Party A has an opportunity to increase price and/or decrease promotion and may recommend to Party B that Party B lower the price and/or increase promotion of the item. At block 1555, if Party A has greater demand, lower promotion, and a higher price, then Recommendation Process 1500 may recommend to Party A that Party A has an opportunity to increase price and may recommend to Party B that Party B remove the item from inventory.

If negative at block 1530, then blocks 1535 and 1540 describe a matrix. At block 1535, if Party A has greater demand (according to Demand Signal 301) and a lower price, then Recommendation Process 1500 may recommend to Party A that Party A has an opportunity to increase price and may recommend to Party B that Party B increase promotion of the item. At block 1540, if Party A has greater demand and a higher price, then Recommendation Process 1500 may recommend to Party A that Party A has an opportunity to increase price and may recommend to Party B that Party B increase promotion of the item or remove the item from inventory.

If negative at block 1510, then (referring to FIG. 15B), at block 1560 a determination may be made regarding whether or not the demand for the item (or items) is high, such as according to Demand Signal 301. If affirmative at block 1560, then at block 1570, Recommendation Process 1500 may recommend to Party B that Party B add the item to items offered by Party B. If negative at block 1560, then at block 1565, Recommendation Process 1500 may recommend to Party B that Party B remove the item or increase promotion of it.

At block 1575, Recommendation Process 1500 may return to block 1505 to iterate over the next Product in the User Home 305 and a corresponding Competitor 310 or the next pair in the User List(s).

At block 1599 Recommendation Process 1500 may return to Quick View Process 1000 or to another routine which may have called Recommendation Process 1500.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

What is claimed is:

1. One or more non-transitory computer-readable storage media comprising a plurality of instructions that in response to being executed cause a computer to:
   receive, via a user computer, over a network, a first user selection including a product, and a brand, vendor and category associated with the product;
   access a set of product information that includes information regarding the selected product, the set of product information including a set of products, wherein the product information is obtained, at least in part, by one or more crawl agents and wherein the product information includes for each product in the set: one or more brands under which the product is sold, a set of vendors offering it for sale, and a product category;
   generate a set of analysis results based on the obtained product information;
   identify a first statistical pattern in a first analysis result from the set of analysis results for the selected product by performing statistical analysis on the product information and the analysis results,
   in which the first statistical pattern is a statistical pattern between two or more types of data included in the first analysis result or in the product information and in which the two or more types of data share a common aspect, and in which the first statistical pattern comprises a cyclic change in the first analysis result,
   in which the set of analysis results includes:
      a social metric, an identification of which product in a sub-set of products leads or follows other products in the sub-set of products in terms of price changes, a demand metric obtained by at least a crawl agent based at least in part on visitors record generated from webpage traffic to one or more online stores at which the product is available, and in which the demand metric is stored in the database coupled to the computer, and a reach of the product in terms of the number of people who visit an online sales venue of the product, in which the social metric is generated based on a number of followers or a number of likes of the product that are obtained periodically by at least the one or more crawl agents to collect from one or more social media websites with which the product has an account, and in which the social metric is stored in a database coupled to the computer;
   transmit to the user computer, over the network, for display to the user, the first analysis result and the first statistical pattern;
   receive, via the user computer, over the network, a create alert command for the product, the create alert command including:
      alert criteria, including at least one of: absolute or percentage change in price, initiation or termination of sales at a venue, and
      a notification window and frequency;
   in response to the command, execute the alert and transmit to the user computer, over the network, a notification;
   receive a second user selection and a second analysis result with respect to the second user selection;
   identify a second statistical pattern in the second analysis result;
   identify a third statistical pattern between the first statistical pattern and the second statistical pattern;
   and display at least the third statistical pattern, via the user interface, to the user, in which:
      the first analysis result comprises a price history of the product,
      the first statistical pattern comprises a cyclic change in the price history of the product,
      the second analysis result comprises a social metric for the product,
      the second statistical pattern comprises a cyclic change in the social metric for the product, and
      the third statistical pattern comprises a cyclic relationship between the first and second statistical patterns.

2. The one or more non-transitory computer-readable storage media of claim 1, in which the first user selection further comprises at least one of a user list and a user favorite.

3. The one or more non-transitory computer-readable storage media of claim 2, in which the user list comprises a custom list or a smart list.

4. The one or more non-transitory computer-readable storage media of claim 3, in which the smart list is created upon receipt of a selection of at least one of a brand, a vendor or a category in the set of product information and at least one criterion for limiting the first analysis result presented in relation to the user list, and in which the custom list comprises a list of products provided by the user.

5. The one or more non-transitory computer-readable storage media of claim 1, in which to display at least the third statistical pattern to the user further comprises to select a scale for the presentation to encompass a range of the third statistical pattern.

6. The one or more non-transitory computer-readable storage media of claim 1, further comprising code that when executed causes the computer to:
   compare the second analysis result relating to the second user selection to the first analysis result, and
   make a first recommendation to the user based on the comparison of the first and second analysis results.

7. The one or more non-transitory computer-readable storage media of claim 6, in which:
   the first analysis result comprises, for a product sold by a first vendor: a demand metric for the product sold by the first vendor, a price history for the product sold by the first vendor, and a promotion metric for the product sold by the first vendor;
   the second analysis result comprises, for a product sold by a second vendor, a demand metric for the product sold by the second vendor, a price history for the product sold by the second vendor, and a promotion metric for the product sold by the first vendor; and
   in which the first recommendation comprises at least one of:
      a recommendation to add or remove the product sold by the first vendor or the product sold by the second vendor from an inventory of the first or second vendor,
      a recommendation to the first or second vendor to charge a higher or lower price for the product sold by the first vendor or the product sold by the second vendor, and
      a recommendation to the first or second vendor to increase or decrease a promotion of the product sold by the first vendor or the product sold by the second vendor.

8. The one or more non-transitory computer-readable storage media of claim 7 further comprising code that when executed causes the computer to:
   determine if the demand metrics in the first and second analysis results are low;

and in response to a determination that they are low, recommend to the user that the product sold by the first vendor or the product sold by the second vendor be removed from inventory.

9. The one or more non-transitory computer-readable storage media of claim 7, further comprising code that when executed causes the computer to:
when:
the price histories of the product sold by the first and second vendors indicate a price difference that exceeds a pre-defined threshold, and
there is a difference in the promotion metrics between the product sold by the first and second vendors, at least one of:
recommend an increase in the price of the product sold by the first vendor or the product sold by the second vendor to a vendor associated with a higher demand metric, a lower promotion metric and a lower current price,
recommend an increase in the price of the product sold by the first vendor or the product sold by the second vendor or a lower promotion to a vendor associated with the higher demand metric, a higher promotion metric, and the lower current price, and
recommend that the product sold by the first vendor or the product sold by the second vendor be discontinued by a vendor associated with a lower demand metric, the lower promotion metric, and the lower current price.

10. The one or more non-transitory computer-readable storage media of claim 1, further comprising code that when executed causes the computer to:
receive from the user, over the network, an instruction to link two or more different products in the set of product information; and
in response to a number of times the two or more different products in the set of product information are linked by any user exceeding a threshold, identify the two or more products as substitutes for each other.

11. The one or more non-transitory computer-readable storage media of claim 1, further comprising code that when executed causes the computer to:
receive an instruction to send a notice to the user when the first analysis result corresponds to a user-specified alarm setting.

12. The one or more non-transitory computer-readable storage media of claim 11, in which the user-specified alarm setting comprises at least a first target in the first user selection and one or more alarm criteria.

13. The one or more non-transitory computer-readable storage media of claim 12, in which the one or more alarm criteria comprise at least one of:
an absolute or percentage change in price of the first target,
a promotion of the first target, and
an inception of availability or discontinuation of availability of the first target.

14. The one or more non-transitory computer-readable storage media of claim 12,
in which the one or more alarm criteria comprise a second target comprising at least one of: a product, a category in a product categorization schema, a brand, and a vendor, and
in which the one or more alarm criteria comprise at least one of an absolute or percentage change in price between the first and second targets and a change in the promotion status of one of the first and second targets relative to either the first or the second target.

15. The one or more non-transitory computer-readable storage media of claim 1, further comprising code that when executed causes the computer to:
associate the user with a competitor of the user selection and in which presenting the analysis result comprises presenting the first analysis result in relation to the user selection and the competitor.

16. The one or more non-transitory computer-readable storage media of claim 1, further comprising code that when executed causes the computer to:
receive a re-price command from the user, and, in response, reprice a product offered by the user in response to a condition of the first analysis result, and
in which the re-price command comprises at least one of an instruction to re-price the product offered by the user to a price higher or lower than a price of a product in the first analysis result.

17. A system comprising a computer processor and a computer memory, the computer memory comprising instructions which, when executed, cause the system to perform the following:
receive, via a user computer, over a network, a user selection including a product, and a brand, vendor and category associated with the product;
access a set of product information that includes information regarding the selected product, the set of product information including a set of products, wherein the product information is obtained, at least in part, by one or more crawl agents and wherein the product information includes for each product in the set:
one or more brands under which the product is sold, a set of vendors offering it for sale, and a categorization schema;
generate a set of analysis results based on the obtained product information;
identify a statistical pattern in a first analysis result from the set of analysis results for the selected product by performing statistical analysis on the product information and the analysis results,
in which the first statistical pattern is a statistical pattern between two or more types of data included in the first analysis result or in the product information and in which the two or more types of data share a common aspect, and in which the first statistical pattern comprises a cyclic change in the first analysis result,
the set of analysis results including:
a social metric, an identification of which product in a sub-set of products leads or follows other products in the sub-set of products in terms of price changes, a demand metric obtained by at least a crawl agent based at least in part on visitors record generated from webpage traffic to one or more online stores at which the product is available, and in which the demand metric is stored in the database coupled to the computer, and a reach of the product in terms of the number of people who visit an online sales venue of the product, in which the social metric is generated based on a number of followers or a number of likes of the product that are obtained periodically by at least the one or more crawl agents to collect from one or more social media websites with which the product has an account, and in which the social metric is stored in a database coupled to the computer;

transmit to the user computer, over the network, for display to the user, the first analysis result and the first statistical pattern;

receive, via the user computer, over the network, a create alert command for the product, the create alert command including:
  alert criteria, including at least one of: absolute or percentage change in price, initiation or termination of sales at a venue, and
  a notification window and frequency;

in response to the command, execute the alert and transmit to the user computer, over the network, a notification;

receive a second user selection and a second analysis result with respect to the second user selection;

identify a second statistical pattern in the second analysis result;

identify a third statistical pattern between the first statistical pattern and the second statistical pattern;

and display at least the third statistical pattern, via the user interface, to the user, in which:
  the first analysis result comprises a price history of the product,
  the first statistical pattern comprises a cyclic change in the price history of the product,
  the second analysis result comprises a social metric for the product,
  the second statistical pattern comprises a cyclic change in the social metric for the product, and
  the third statistical pattern comprises a cyclic relationship between the first and second statistical patterns.

* * * * *